United States Patent
Roach et al.

(10) Patent No.: US 8,938,871 B2
(45) Date of Patent: Jan. 27, 2015

(54) GOLF CLUB HEAD WITH HIGH SPECIFIC-GRAVITY MATERIALS

(71) Applicant: Cobra Golf Incorporated, Carlsbad, CA (US)

(72) Inventors: Ryan L. Roach, Carlsbad, CA (US);
Peter L. Soracco, Carlsbad, CA (US);
Tim A. Beno, San Diego, CA (US);
Andrew Curtis, San Diego, CA (US);
Michael S. Yagley, Carlsbad, CA (US)

(73) Assignee: Cobra Golf Incorporated, Carlsbad, CA (US)

( * ) Notice: Subject to any disclaimer, the term of this patent is extended or adjusted under 35 U.S.C. 154(b) by 253 days.

(21) Appl. No.: 13/644,516

(22) Filed: Oct. 4, 2012

(65) Prior Publication Data

US 2013/0035178 A1    Feb. 7, 2013

Related U.S. Application Data

(63) Continuation-in-part of application No. 12/581,975, filed on Oct. 20, 2009, now Pat. No. 8,303,433, which is a continuation-in-part of application No. 12/076,322, filed on Mar. 17, 2008, now Pat. No.
(Continued)

(51) Int. Cl.
*B23P 6/00* (2006.01)
*A63B 53/04* (2006.01)
(Continued)

(52) U.S. Cl.
CPC ............. *A63B 53/0466* (2013.01); *B23P 6/00* (2013.01); *A63B 2053/0416* (2013.01); *A63B 53/04* (2013.01); *A63B 53/06* (2013.01); *A63B 53/08* (2013.01); *A63B 2053/0495* (2013.01);
(Continued)

(58) Field of Classification Search
CPC ........................... A63B 2053/0491; B23P 6/00
USPC ................. 473/334, 335, 345, 349; 29/401.1, 29/402.13, 402.16, 402.18
See application file for complete search history.

(56) References Cited

U.S. PATENT DOCUMENTS 1,349,806 A    8/1920   Booth
1,361,258 A    12/1920  Horton
(Continued)

FOREIGN PATENT DOCUMENTS

JP    08-089603 A    4/1996
JP    09-192269 A    7/1997
(Continued)

OTHER PUBLICATIONS

Jackson, Jeff, The Modern Guide to Golf Clubmaking, Ohio: Dynacraft Golf Products, Inc. copyright 1994, p. 239.
(Continued)

*Primary Examiner* — Jermie Cozart
(74) *Attorney, Agent, or Firm* — Mark S. Leonardo; Brown Rudnick LLP

(57) ABSTRACT

Golf club heads comprising weighted materials that can be added, removed, and moved in order to change the weight and center of gravity of the club. In some instances, the weighted material is a polymer composition comprising metal and having a specific gravity greater than about 4. Also disclosed are methods of modifying the center of gravity of a golf club head and methods of manufacturing golf club heads.

5 Claims, 17 Drawing Sheets

Related U.S. Application Data 8,007,371, which is a continuation-in-part of application No. 11/363,098, filed on Feb. 28, 2006, now Pat. No. 7,524,249, which is a continuation-in-part of application No. 11/110,733, filed on Apr. 21, 2005, now Pat. No. 7,658,686, and a continuation-in-part of application No. 11/180,406, filed on Jul. 13, 2005, now Pat. No. 7,377,860.

(51) Int. Cl.
 A63B 53/06 (2006.01)
 A63B 53/08 (2006.01)

(52) U.S. Cl.
 CPC ....... *A63B2209/00* (2013.01); *A63B 2209/023* (2013.01); *A63B 2210/50* (2013.01); *A63B 2053/0433* (2013.01); *A63B 2053/0412* (2013.01); *A63B 2053/0408* (2013.01); *A63B 2053/0491* (2013.01)
 USPC .................. 29/401.1; 29/402.13; 29/402.16; 29/402.18; 473/334; 473/335; 473/345

(56) References Cited

U.S. PATENT DOCUMENTS

| | | |
|---|---|---|
| 1,412,650 A | 4/1922 | Booth |
| 1,452,845 A | 4/1923 | Pryde |
| 1,455,379 A | 5/1923 | Allen |
| 1,552,297 A | 9/1925 | Harness |
| 1,559,299 A | 10/1925 | Barach |
| 1,574,213 A | 2/1926 | Tyler |
| 1,575,364 A | 3/1926 | Hodgkins |
| 1,705,997 A | 3/1929 | Williams |
| 3,166,320 A | 1/1965 | Onions |
| 3,556,533 A | 1/1971 | Hollis |
| 3,941,390 A | 3/1976 | Hussey |
| 3,966,210 A | 6/1976 | Rozmus |
| D240,644 S | 7/1976 | Manfrin |
| 3,985,363 A | 10/1976 | Jepson et al. |
| 4,021,047 A | 5/1977 | Mader |
| 4,043,563 A | 8/1977 | Churchward |
| 4,052,075 A | 10/1977 | Daly |
| 4,085,934 A | 4/1978 | Churchward |
| 4,193,601 A | 3/1980 | Reid, Jr. et al. |
| D262,049 S | 11/1981 | Simmons |
| 4,432,549 A | 2/1984 | Zebelean |
| 4,438,931 A | 3/1984 | Motomiya |
| 4,653,756 A | 3/1987 | Sato |
| 4,762,322 A | 8/1988 | Molitor et al. |
| 4,792,140 A | 12/1988 | Yamaguchi et al. |
| 4,869,507 A | 9/1989 | Sahm |
| 4,872,683 A | 10/1989 | Doran et al. |
| 4,883,275 A | 11/1989 | Boone |
| 5,186,465 A | 2/1993 | Chorne |
| 5,205,560 A | 4/1993 | Hoshi et al. |
| 5,213,328 A | 5/1993 | Long et al. |
| 5,255,913 A | 10/1993 | Tsuchida |
| 5,272,802 A | 12/1993 | Stites, III |
| 5,310,186 A | 5/1994 | Karsten |
| 5,346,217 A | 9/1994 | Tsuchiya et al. |
| 5,435,558 A | 7/1995 | Iriarte |
| 5,447,309 A | 9/1995 | Vincent |
| 5,474,297 A | 12/1995 | Levin |
| 5,484,155 A | 1/1996 | Yamawaki et al. |
| 5,547,188 A | 8/1996 | Dumontier et al. |
| 5,624,331 A | 4/1997 | Lo et al. |
| 5,665,014 A | 9/1997 | Sanford et al. |
| 5,683,309 A | 11/1997 | Reimers |
| 5,769,736 A | 6/1998 | Sato |
| 5,785,609 A | 7/1998 | Sheets et al. |
| 5,788,587 A | 8/1998 | Tseng |
| 5,797,176 A | 8/1998 | Rose et al. |
| 5,842,935 A | 12/1998 | Nelson |
| 5,935,020 A | 8/1999 | Stites et al. |
| 5,947,840 A | 9/1999 | Ryan |
| 5,997,415 A | 12/1999 | Wood |
| D418,885 S | 1/2000 | Wanchena |
| 6,012,989 A | 1/2000 | Saksun, Sr. |
| 6,059,669 A | 5/2000 | Pearce |
| 6,074,308 A | 6/2000 | Domas |
| 6,077,171 A | 6/2000 | Yoneyama |
| 6,089,994 A | 7/2000 | Sun |
| 6,123,627 A | 9/2000 | Antonious |
| 6,139,446 A | 10/2000 | Wanchena |
| 6,149,534 A | 11/2000 | Peters et al. |
| 6,162,133 A | 12/2000 | Peterson |
| 6,183,377 B1 | 2/2001 | Liang |
| 6,217,461 B1 | 4/2001 | Galy |
| 6,248,025 B1 | 6/2001 | Murphy et al. |
| 6,248,026 B1 | 6/2001 | Wanchena |
| 6,254,494 B1 | 7/2001 | Hasebe et al. |
| 6,332,848 B1 | 12/2001 | Long et al. |
| 6,340,337 B2 | 1/2002 | Hasebe et al. |
| 6,354,962 B1 | 3/2002 | Galloway et al. |
| 6,409,612 B1 | 6/2002 | Evans et al. |
| 6,422,951 B1 | 7/2002 | Burrows |
| 6,440,009 B1 | 8/2002 | Guibaud et al. |
| 6,471,604 B2 | 10/2002 | Hocknell et al. |
| 6,482,106 B2 | 11/2002 | Saso |
| 6,565,452 B2 | 5/2003 | Helmstetter et al. |
| 6,572,491 B2 | 6/2003 | Hasebe et al. |
| 6,575,845 B2 | 6/2003 | Galloway et al. |
| 6,592,468 B2 | 7/2003 | Vincent et al. |
| 6,623,378 B2 | 9/2003 | Beach et al. |
| 6,645,086 B1 | 11/2003 | Chen |
| 6,648,773 B1 | 11/2003 | Evans |
| 6,716,114 B2 | 4/2004 | Nishio |
| 6,739,983 B2 | 5/2004 | Helmstetter et al. |
| 6,739,984 B1 | 5/2004 | Ciasullo |
| 6,773,360 B2 | 8/2004 | Willett et al. |
| 6,776,723 B2 | 8/2004 | Bliss et al. |
| 6,860,818 B2 | 3/2005 | Mahaffey |
| 6,872,152 B2 | 3/2005 | Beach et al. |
| 6,890,267 B2 | 5/2005 | Mahaffey et al. |
| 6,896,625 B2 | 5/2005 | Grace |
| 6,902,497 B2 | 6/2005 | Deshmukh et al. |
| 6,913,546 B2 | 7/2005 | Kakiuchi |
| 6,926,615 B1 | 8/2005 | Souza et al. |
| 6,929,565 B2 | 8/2005 | Nakahara et al. |
| 6,932,875 B2 | 8/2005 | Cheng et al. |
| 6,955,612 B2 | 10/2005 | Lu |
| 6,988,956 B2 | 1/2006 | Cover et al. |
| 6,991,555 B2 | 1/2006 | Reese |
| 6,991,558 B2 | 1/2006 | Beach et al. |
| 7,008,332 B2 | 3/2006 | Liou |
| 7,022,030 B2 | 4/2006 | Best et al. |
| 7,025,692 B2 | 4/2006 | Erickson et al. |
| 7,070,517 B2 | 7/2006 | Cackett et al. |
| 7,108,609 B2 | 9/2006 | Stites et al. |
| 7,128,664 B2 | 10/2006 | Onoda et al. |
| 7,140,974 B2 | 11/2006 | Chao et al. |
| 7,147,573 B2 | 12/2006 | DiMarco |
| 7,156,752 B1 | 1/2007 | Bennett |
| 7,160,040 B2 | 1/2007 | Matsushima |
| 7,163,468 B2 | 1/2007 | Gibbs et al. |
| 7,166,038 B2 | 1/2007 | Williams et al. |
| 7,169,060 B2 | 1/2007 | Stevens et al. |
| 7,175,541 B2 | 2/2007 | Lo |
| 7,186,190 B1 | 3/2007 | Beach et al. |
| 7,204,768 B2 | 4/2007 | Nakahara et al. |
| 7,252,599 B2 | 8/2007 | Hasegawa |
| 7,258,625 B2 | 8/2007 | Kawaguchi et al. |
| 7,281,993 B2 | 10/2007 | Oyama |
| 7,303,487 B2 | 12/2007 | Kumamoto |
| 7,338,390 B2 | 3/2008 | Lindsay |
| D567,888 S | 4/2008 | Soracco |
| 7,371,191 B2 | 5/2008 | Sugimoto |
| 7,377,860 B2 | 5/2008 | Breier et al. |
| 7,491,131 B2 | 2/2009 | Vinton |
| 7,524,249 B2 | 4/2009 | Breier et al. |
| 7,530,901 B2 | 5/2009 | Imamoto et al. |
| 7,549,933 B2 | 6/2009 | Kumamoto |
| 7,625,298 B2 | 12/2009 | Bennett |

(56) References Cited

U.S. PATENT DOCUMENTS

| | | |
|---|---|---|
| 7,632,195 B2 | 12/2009 | Jorgensen |
| 7,658,686 B2 | 2/2010 | Soracco |
| 7,753,809 B2 | 7/2010 | Cackett et al. |
| 7,758,451 B2 | 7/2010 | Liang et al. |
| 7,803,065 B2 | 9/2010 | Breier et al. |
| 7,806,782 B2 | 10/2010 | Stites et al. |
| 8,303,433 B2 | 11/2012 | Roach et al. |
| 2001/0001302 A1 | 5/2001 | Murphy et al. |
| 2001/0049310 A1 | 12/2001 | Cheng et al. |
| 2002/0045490 A1 | 4/2002 | Ezawa et al. |
| 2002/0077195 A1 | 6/2002 | Carr et al. |
| 2002/0137576 A1 | 9/2002 | Dammen |
| 2002/0160858 A1 | 10/2002 | Lee |
| 2003/0045371 A1 | 3/2003 | Wood et al. |
| 2003/0100381 A1 | 5/2003 | Murphy et al. |
| 2003/0134690 A1 | 7/2003 | Chen |
| 2003/0144078 A1 | 7/2003 | Setokawa et al. |
| 2003/0162608 A1 | 8/2003 | Chen |
| 2004/0138002 A1 | 7/2004 | Murray |
| 2004/0176177 A1 | 9/2004 | Mahaffey et al. |
| 2004/0192468 A1 | 9/2004 | Onoda et al. |
| 2004/0242343 A1 | 12/2004 | Chao et al. |
| 2004/0254030 A1 | 12/2004 | Nishitani et al. |
| 2005/0119070 A1 | 6/2005 | Kumamoto |
| 2005/0159243 A1 | 7/2005 | Chuang |
| 2005/0170907 A1 | 8/2005 | Saso |
| 2005/0215354 A1 | 9/2005 | Kumamoto |
| 2005/0272527 A1 | 12/2005 | Sugimoto |
| 2006/0014592 A1 | 1/2006 | Sugimoto |
| 2006/0052177 A1 | 3/2006 | Nakahara et al. |
| 2006/0052181 A1 | 3/2006 | Serrano et al. |
| 2006/0100032 A1 | 5/2006 | Imamoto et al. |
| 2006/0116218 A1 | 6/2006 | Burnett et al. |
| 2006/0240907 A1 | 10/2006 | Latiri |
| 2007/0054751 A1 | 3/2007 | Breier et al. |
| 2007/0060414 A1 | 3/2007 | Breier et al. |
| 2007/0265109 A1 | 11/2007 | Elmer |
| 2008/0070721 A1 | 3/2008 | Chen et al. |
| 2008/0227564 A1 | 9/2008 | Breier et al. |
| 2008/0242445 A1 | 10/2008 | Mergy et al. |
| 2008/0261715 A1 | 10/2008 | Carter |
| 2008/0268980 A1 | 10/2008 | Breier et al. |
| 2009/0118034 A1 | 5/2009 | Yokota |
| 2009/0186717 A1 | 7/2009 | Stites et al. |
| 2009/0203465 A1 | 8/2009 | Stites et al. |
| 2010/0041490 A1 | 2/2010 | Boyd et al. |
| 2010/0130304 A1 | 5/2010 | Soracco |
| 2010/0130305 A1 | 5/2010 | Soracco |
| 2010/0331103 A1 | 12/2010 | Takahashi et al. |
| 2011/0053706 A1 | 3/2011 | Breier et al. |

FOREIGN PATENT DOCUMENTS

| | | |
|---|---|---|
| JP | 2000-024149 A | 1/2000 |
| JP | 2002-336389 A | 11/2002 |
| JP | 2003-093554 A | 4/2003 |
| JP | 2003-310808 A | 11/2003 |
| JP | 2004-121744 A | 4/2004 |
| JP | 2004-159680 A | 6/2004 |
| JP | 2004-337327 A | 12/2004 |
| JP | 2006-025929 A | 2/2006 |
| JP | 2006-130065 A | 5/2006 |
| WO | 2004/052472 A1 | 6/2004 |
| WO | 2007/101350 A1 | 9/2007 |

OTHER PUBLICATIONS

Japanese Office Action for Application No. 2007-311561, dated Jun. 30, 2010, in 7 pages.

Japanese Office Action titled Pretrial Reexamination Report for Japanese Application No. 2007-085624, (Appeal Trial No. 2010-009497), dated Jul. 7, 2010, in 6 pages.

Notice of Allowance dated Sep. 28, 2009 of corresponding U.S. Appl. No. 11/110,733.

Non-Final Office Action dated May 20, 2009 of corresponding U.S. Appl. No. 11/110,733.

Final Office Action dated Oct. 1, 2008 of corresponding U.S. Appl. No. 11/110,733.

Non-Final Office Action dated Dec. 31, 2007 of corresponding U.S. Appl. No. 11/110,733.

Non-Final Office Action dated Jun. 5, 2007 of corresponding U.S. Appl. No. 11/110,733.

Notice of Allowance dated Dec. 31, 2008 of corresponding U.S. Appl. No. 11/363,098.

Non-Final Office Action dated Jun. 12, 2008 of corresponding U.S. Appl. No. 11/363,098.

Non-Final Office Action dated Oct. 27, 2009 of corresponding U.S. Appl. No. 11/591,588.

Non-Final Office Action dated Dec. 7, 2009 of corresponding U.S. Appl. No. 11/898,756.

Non-Final Office Action dated Nov. 13, 2009 of corresponding U.S. Appl. No. 11/600,081.

European Search Report for European Application No. 10013627.4-2318, dated Mar. 11, 2011, in 8 pages.

GOLF CLUB HEAD WITH HIGH SPECIFIC-GRAVITY MATERIALS

CROSS REFERENCE TO RELATED APPLICATIONS

This application is a continuation-in-part of U.S. patent application Ser. No. 12/581,975, filed Oct. 20, 2009, now pending, which is a continuation-in-part of U.S. patent application Ser. No. 12/076,322, filed on Mar. 17, 2008, now U.S. Pat. No. 8,007,371, which is a continuation-in-part of U.S. patent application Ser. No. 11/363,098, filed on Feb. 28, 2006, now U.S. Pat. No. 7,524,249, which is a continuation-in-part of U.S. patent application Ser. No. 11/110,733, filed on Apr. 21, 2005, now U.S. Pat. No. 7,658,686. U.S. patent application Ser. No. 11/363,098 is also a continuation-in-part of U.S. patent application Ser. No. 11/180,406, filed on Jul. 13, 2005, now U.S. Pat. No. 7,377,860. Each of these applications is incorporated herein by reference in their entireties.

FIELD OF THE INVENTION

The present invention generally relates to a golf club head with enhanced weight distribution and mechanical properties. In particular, the present invention relates to a metal wood type club with a moveable insert, which allows for a maximization of legal club head dimensions and the ability to manipulate various characteristics of the club head.

BACKGROUND OF THE INVENTION

Golf club heads come in many different forms and makes, such as wood- or metal-type (including drivers and fairway woods), iron-type (including wedge-type club heads), utility- or specialty-type, and putter-type. Each of these styles has a prescribed function and make-up. The present invention primarily relates to hollow golf club heads, such as wood-type and utility-type (generally referred to herein as wood-type golf clubs).

Wood-type type golf club heads generally include a front or striking face, a crown, a sole, and an arcuate skirt including a heel, a toe, and a back. The crown and skirt are sometimes referred to as a "shell." The front face interfaces with and strikes the golf ball. A plurality of grooves, sometimes referred to as "score lines," may be provided on the face to assist in imparting spin to the ball and for decorative purposes. The crown is generally configured to have a particular look to the golfer and to provide structural rigidity for the striking face. The sole of the golf club contacts and interacts with the ground during the swing.

The design and manufacture of wood-type golf clubs requires careful attention to club head construction. Among the many factors that must be considered are material selection, material treatment, structural integrity, and overall geometrical design. Exemplary geometrical design considerations include loft, lie, face angle, horizontal face bulge, vertical face roll, face size, sole curvature, center of gravity, and overall head weight. In addition, the interior design of the club head may be tailored to achieve particular characteristics, such as by including hosel or shaft attachment means, perimeter weighting on the face or body of the club head, and fillers within hollow club heads.

Club heads typically are formed from stainless steel, aluminum, or titanium, and may be cast, stamped by forming sheet metal with pressure, forged, or formed by a combination of any two or more of these processes. In fact, clubs were originally manufactured primarily by casting durable metallic material such as stainless steel, aluminum, beryllium copper, etc. into a unitary structure comprising a metal body, face, and hosel. However, as technology progressed, it became more desirable to increase the performance of the face of the club, usually by using a titanium material. Today, the club heads may be formed from multiple pieces that are welded or otherwise joined together to form a hollow head, as is often the case of club heads designed with inserts, such as sole plates or crown plates.

The multi-piece constructions facilitate access to the cavity formed within the club head, thereby permitting the attachment of various other components to the head such as internal weights and the club shaft. The cavity may remain empty, or may be partially or completely filled, such as with foam. In addition, due to difficulties in manufacturing one-piece club heads to high dimensional tolerances, the use of multi-piece constructions allows the manufacture of a club head to adhere to a tighter set of standards.

In the case of one-piece heads, it may be necessary to inject an adhesive into the club head to provide the correct swing weight and to collect and retain any debris that may be in the club head. Known in the industry as "rat glue" or "rattle glue" this adhesive is often used in the finishing of hollow club head such as metal drivers and hybrid. The adhesive is typically injected as one of the last steps in the fabrication process, and may be thermoset, or hot-injected and allowed to cool and solidify. In some instances, it is advantageous for the adhesive to remain tacky throughout the life of the club in order to sequester internal debris that is dislocated as the club is used, i.e., due to repeated striking. Typically the adhesive is injected through a small hole in the club head and allowed to distribute throughout the interior.

With a high percentage of amateur golfers constantly searching for more distance on their shots, particularly their drives, the golf industry has responded by providing golf clubs specifically designed with distance in mind. The head sizes of wood-type golf clubs have increased, allowing the club to possess a higher moment of inertia, which translates to a greater ability to resist twisting on off-center hits. As a wood-type club head becomes larger, its center of gravity will be moved back away from the face and further toward the toe, resulting in hits flying higher and further to the right than expected (for right-handed golfers). And, because the center of gravity is moved further away from hosel axis, the larger heads can also cause these clubs to remain open on contact, thereby inducing a "slice" effect (in the case of a right-handed golfer the ball deviates to the right).

While a reduction in loft of a larger club head, offsetting the head, and/or incorporating a hook face angle may help to compensate for this shift in the center of gravity and resulting higher and right-biased hits by "squaring" the face at impact, none of these methods are completely sufficient in solving the issues relating to the larger club heads.

Another technological breakthrough in recent years to provide the average golfer with more distance is to make larger head clubs while keeping the weight constant or even lighter by casting consistently thinner shell thicknesses and using lighter materials such as titanium, magnesium, and composites. Also, the faces of the clubs have been steadily becoming extremely thin, because a thinner face will maximize what is known as the Coefficient of Restitution (COR). For example, the more a face rebounds upon impact, the more energy is imparted to the ball, thereby increasing the resulting shot distance.

With the emphasis on thinner shells, strategic weighting has become important to club manufacturers. Accordingly, weight elements are usually placed at specific locations believed to have a positive influence on the flight of the ball or to overcome a particular golfer's shortcomings. As previously stated, a major problem area of the higher handicap golfer is the tendency to "slice," which, in addition to deviating the ball to the right, also imparts a greater spin to the ball, thus further reducing the overall shot distance.

As such, a need exists in the art to further enhance weight distribution of a golf club head in order to reduce or eliminate the higher spin and "slice effect" currently an issue with the larger club heads. In addition, it would be advantageous to maximize playability of the club by maximizing the dimensions allowable by the USGA, both heel to toe and face to back. The present invention contemplates such enhancements.

SUMMARY OF THE INVENTION

The present invention is directed to golf club heads and methods for adjusting the distribution of weight in the heads, thereby changing the center of gravity in the heads. The weight distribution may be modified at various points in the club head life. In some embodiments, the weight distribution is adjusted by the user. In other embodiments, the weight is adjusted during manufacturing or by a professional using specialized tools at a fitting.

In one instance the invention is a golf club head comprising a body defined by a face, a back, a heel, a toe, a sole, a crown, and at least one adjustable insert. The adjustable insert is capable of movement in the face to back direction. The adjustable insert has at least one adjustment mechanism and at least one locking mechanism, which allows for the insert to be locked into at least one position. In one embodiment, the insert is capable of movement in increments of less than about 0.05 inch. According to one aspect of the invention, the adjustable insert is rotatable about a center axis. The adjustment mechanism may take many forms. For example, the adjustment mechanism may comprise a plurality of notches located on the body of the club head and a deformable tab located on the adjustable insert and designed to fit within a notch.

The club head has a first distance from the toe to the heel. In addition, the club head has a second distance from the face to the back without the adjustable insert. Finally, the club head has a third distance from the face to the back of the adjustable insert when the insert is extended to a maximum in the face to back direction. In one embodiment, the third distance is greater than about 5 inches. The third distance may be greater than or equal to the first distance times 1.10. The third distance may be greater than or equal to the first distance times 1.05. In another embodiment, the third distance may be greater than or equal to the first distance times 1.00. The third distance may be greater than or equal to 1.05 times the second distance. In another embodiment, the third distance may be greater than or equal to 1.50 times the second distance.

In one embodiment, the adjustable insert comprises a portion with a specific gravity greater than the specific gravity of the body. For example, the specific gravity of a portion of the insert may be about 7 or more. The high specific gravity portion may comprise less than about 40 percent of the total volume of the adjustable insert. In one embodiment, the high specific gravity portion may be less than about 20 percent of the total volume of the adjustable insert. The high specific gravity portion may be located substantially on the toe side, the heel side, or on both sides of the insert.

According to one aspect of the invention, the adjustable insert may have a low specific gravity portion with a specific gravity lower than that of the body. For example, the specific gravity of the low specific gravity portion may be less than about 4. In another embodiment, the adjustable insert further comprises a first portion and a second portion, the second portion has a specific gravity greater than the first portion, and the second portion comprises up to about 30 percent of the total volume of the adjustable insert.

In another instance, the invention is a golf club head having a weighted component comprising a polymer composition and a metal. The polymer composition, including the metal, has a specific gravity greater than about 4. Typically, the weighted polymer composition is used with a golf club head having a body comprising a face, a back, a heel, a toe, a sole, and a crown that together form a hollow, interior volume of the club head. The polymer composition may be a spray coating, a putty, or an adhesive that dries to a solid. In some embodiments, the club head has depressions for receiving the polymer composition. In some embodiments, the golf club head comprises a removable portion that provides access to the interior of the club head. In other embodiments, the golf club head comprises a port, and the polymer composition is injected into the head through the port.

In another instance, the invention is a method of modifying the center of gravity of a golf club head comprising removing a portion of the club head to access the interior of the club head, contacting the interior of the club head with a polymer composition comprising a metal and having a specific gravity greater than about 4, and reassembling the club head. A related method may be used to modify the center of gravity of a golf club head, comprising removing a portion of a club head to access the interior of the club head, removing from the the interior of the club head a polymer composition comprising a metal and having a specific gravity greater than about 4, and reassembling the club head. Also disclosed are kits for modifying the center of gravity of a golf club head including instructions and a polymer composition comprising a metal. In some embodiments, the kits additionally include a club head and a tool for removing a portion of the club head to access the interior of the club head. In some embodiments, the kits additionally include a golf club, having a club head, and a tool for removing a portion of the club head to access the interior of the club head. In some embodiments, the instructions comprise directions for accessing multimedia content regarding modifying the center of gravity of a golf club head via a network, e.g., via the internet.

In another aspect, the invention includes a method of manufacturing a golf club head comprising inserting a directional applicator through a port in the golf club head into the interior volume of the club head and injecting a polymer composition having a specific gravity greater than about 4 into the interior volume of the club head. In some embodiments, the polymer composition is injected substantially toward the toe or the sole of the club.

Additional aspects of the invention will be evident to one of skill in the art upon viewing the below disclosure and figures.

BRIEF DESCRIPTION OF THE DRAWINGS

The present invention is described with reference to the accompanying drawings, in which like reference characters reference like elements, and wherein.

DETAILED DESCRIPTION OF THE INVENTION

The present invention is directed to enhanced weighting of a club head. In one aspect of the invention, weight elements are incorporated directly into the club head. The placement of weight elements is designed so that the spin of the ball will be reduced and also so that a "draw" (a right-to-left ball flight for a right-handed golfer) will be imparted to the ball flight. This ball flight pattern is also designed to help the distance-challenged golfer because a ball with a lower spin rate will generally roll a greater distance after initially contacting the ground than would a ball with a greater spin rate.

In another aspect of the invention, the club head has an adjustable insert that is capable of movement in the face to back direction and is further capable of locking into a desired location. The insert may be adjusted so that the total distance from the face to the back of the club when the insert is fully extended approaches about 5 inches. The total distance from the face to the back of the club when the insert is fully extended may be related to the distance from the toe to the heel. For example, the total distance from the face to the back with the insert at a fully extended position may be greater than the distance from the toe to the heel of the golf club, which allows for the golfer to adjust the face to back distance to approach a predetermined distance.

In yet another aspect of the invention, at least a portion of the club head of the invention is treated with a thermal or combustion spray coating to alter the weight distribution of the club head. The coating may be applied to the interior and/or exterior of the club head. The club head may also be weighted using conformable materials (shapeable to fill a space) with high specific gravities, such as putties, glues, caulk, and adhesives. In some instances, the conformable materials are applied with special applicators using access ports in club heads.

A wide variety of materials are available that provide the needed characteristics of high specific gravity, strength, and workability. Table 1 shows an exemplary list of materials suitable for use with the invention and corresponding specific gravities. The materials may be incorporated into aspects of the invention, described below, as pure materials, as alloys, or as mixtures, for example tungsten filings in an epoxy resin.

TABLE 1

Specific Gravities of Some Materials

| Material | Specific Gravity (relative to pure water) |
| --- | --- |
| Aluminum | 2.5 |
| Brass | 8.2-8.7 |
| Cast Iron | 6.8-7.8 |
| Copper | 8.9 |
| Gold | 19.3 |
| Lead | 11.3 |
| Molybdenum | 10.2 |
| Nickel | 8.8 |
| Platinum | 21.4 |
| Silver | 10.5 |
| Stainless Steel | 7.5-8.0 |
| Tin | 7.3 |
| Tungsten | 19.6 |
| Uranium (depleted) | 18.9 |
| Zinc | 7.1 |

Each aspect is discussed in greater detail below.

Weighted Inserts

Figure 1:
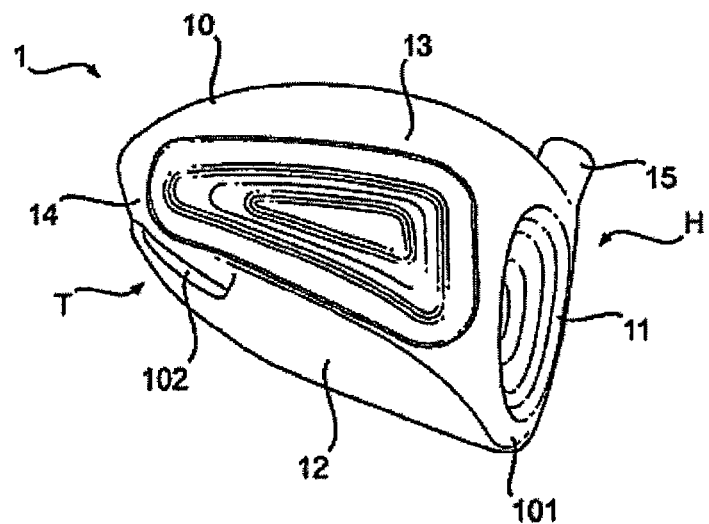
FIG. 1 shows a golf club head of the present invention.

FIG. 1 shows a golf club head 1 of the present invention. The club head 1 includes a body 10 having a strike face 11, a sole 12, a crown 13, a skirt 14, and a hosel 15. The body 10 defines a hollow, interior volume 16. Foam or other material may partially or completely fill the interior volume 16. Weights may optionally be included within the interior volume 16. The face 11 may be provided with grooves or score lines therein of varying design. The club head 1 has a toe T and a heel H.

Figure 2:
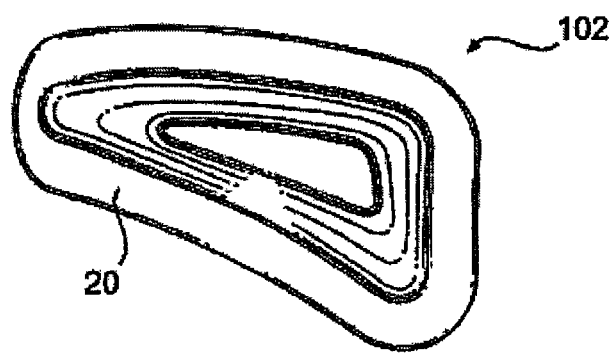
FIG. 2 shows a body member of the golf club head of FIG. 1.

The club head 1 is comprised of a plurality of body members that cooperatively define the interior volume 16. A first body member 101 includes a sole portion and a face portion. The first body member 101 may include a complete face 11 and sole 12. Alternatively, either or both the face 11 and the sole 12 can be inserts coupled to the first body member 101. The club head 1 also includes at least one second body member 102 coupled to the first body member 101 along the skirt 14 in known fashion. The crown 13 can be unitarily a portion of either body member 101, 102 or it may be an insert coupled to either of the body members 101, 102. The second body member 102 includes a concave portion 20 that, when the body members 101, 102 are coupled together, extends inward into the interior volume 16. FIG. 2 shows an isolated view of an exemplary second body member 102.

The first body member 101 preferably is formed of a metallic material such as stainless steel, aluminum, or titanium. The material of the first body member 101 is chosen such that it can withstand the stresses and strains incurred during a golf swing, including those generated through striking a golf ball or the ground. The club head 1 can be engineered to create a primary load bearing structure that can repeatedly withstand such forces. Other portions of the club head 1, such as the skirt 14, experience a reduced level of stress and strain and advantageously can be replaced with a lighter, weight-efficient secondary material. Lighter weight materials, such as low density metal alloys, plastic, composite, and the like, which have a lower density or equivalent density than the previously mentioned metallic materials, can be used in these areas, beneficially allowing the club head designer to redistribute the "saved" weight or mass to other, more beneficial locations of the club head 1. These portions of the club head 1 can also be made thinner, enhancing the weight savings.

Exemplary uses for this redistributed weight include increasing the overall size of the club head 1, expanding the size of the club head "sweet spot," which is a term that refers to the area of the face 11 that results in a desirable golf shot upon striking a golf ball, repositioning the club head 1 center of gravity, and/or producing a greater moment of inertia (MOI). Inertia is a property of matter by which a body remains at rest or in uniform motion unless acted upon by some external force. MOI is a measure of the resistance of a body to angular acceleration about a given axis, and is equal to the sum of the products of each element of mass in the body and the square of the element's distance from the axis. Thus, as the distance from the axis increases, the MOI increases, making the club more forgiving for off-center hits since less energy is lost during impact from club head twisting. Moving or rearranging mass to the club head perimeter enlarges the sweet spot and produces a more forgiving club. Increasing the club head size and moving as much mass as possible to the extreme outermost areas of the club head 1, such as the heel H, the toe T, or the sole 12, maximizes the opportunity to enlarge the sweet spot or produce a greater MOI, making the golf club hotter and more forgiving.

The second body member 102 is light-weight, which gives the opportunity to displace the club head center of gravity downward and to free weight for more beneficial placement elsewhere without increasing the overall weight of the club head 1. When the wall thickness of the second body member 102 is at the minimum range of the preferred thickness, a reinforcing body layer can be added in the critical areas in case the member shows deformations. These benefits can be further enhanced by making the second body member 102 thin. To ensure that the structural integrity of the club head 1 is maintained, these thin panels may preferably include a concave portion 20. Inclusion of these concave portions 20 allow the second body member 102 to withstand greater stress, both longitudinally and transversely, without sustaining permanent deformation or affecting the original cosmetic condition, ensuring the structural integrity of the club head 1 is maintained.

In one embodiment, the thickness for the first body member 101 may range from about 0.03 inch to about 0.05 inch, preferably from about 0.035 to about 0.045 inch. The thickness for the second body member 102 may range from about 0.015 inch to about 0.025 inch, preferably from about 0.018 inch to about 0.022 inch.

The concave portion 20 may displace at least about 10 cubic centimeters. More preferably, the concave portion 20 displaces at least about 20 cubic centimeters, and even more preferably, about 25 cubic centimeters. While the club head 1 can be virtually any size, preferably it is a legal club head. A plurality of concave portions 20 may be used with the club head 1. For example, concave portions 20 of uniform or varying size may be positioned in the toe, heel, back, etc.

Figure 3:
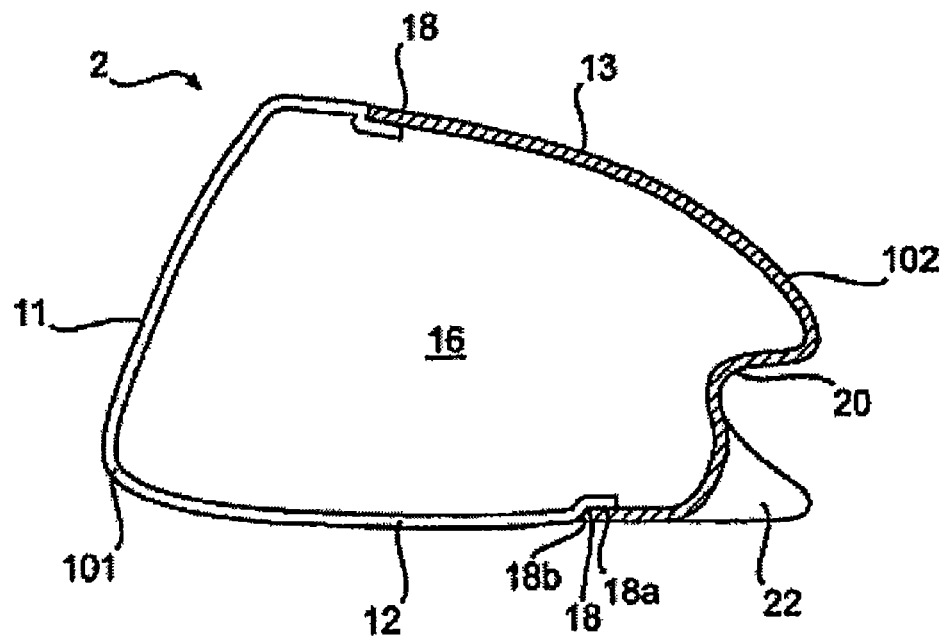
FIG. 3 shows a second club head of the present invention.
Figure 4:
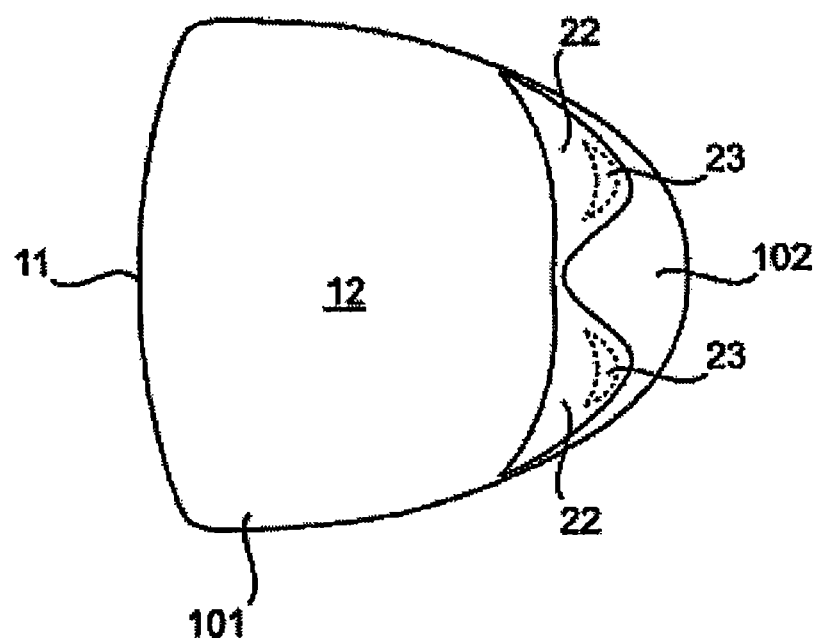
FIG. 4 shows a bottom view of the club head of FIG. 3.
Figure 5:
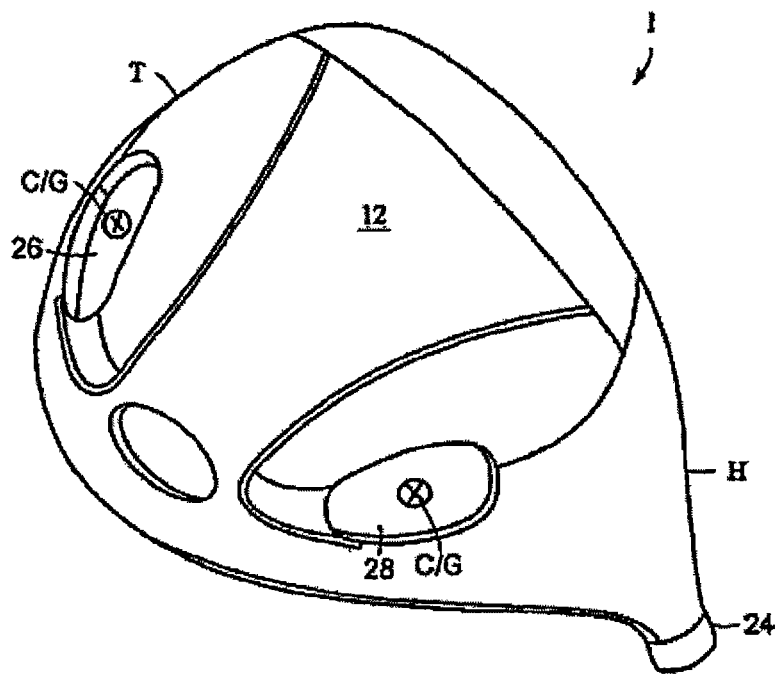
FIG. 5 shows a bottom perspective view of a club head of the present invention.
Figure 6:
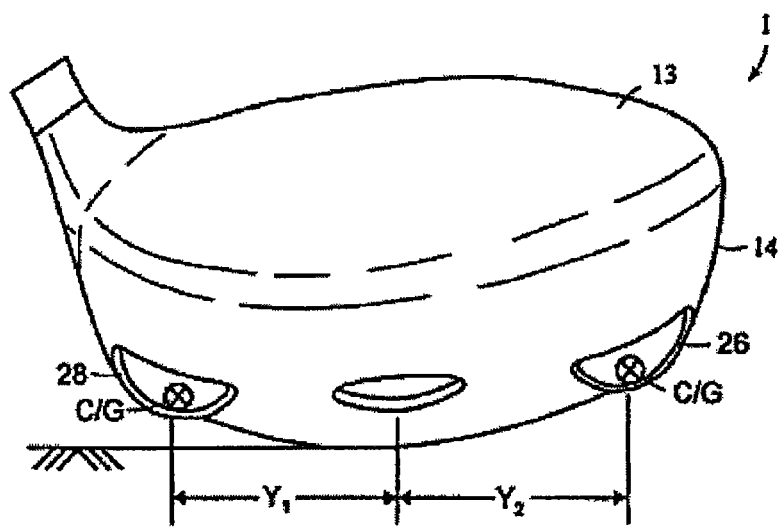
FIG. 6 shows a rear elevation view of the club head of FIG. 5.
Figure 7:
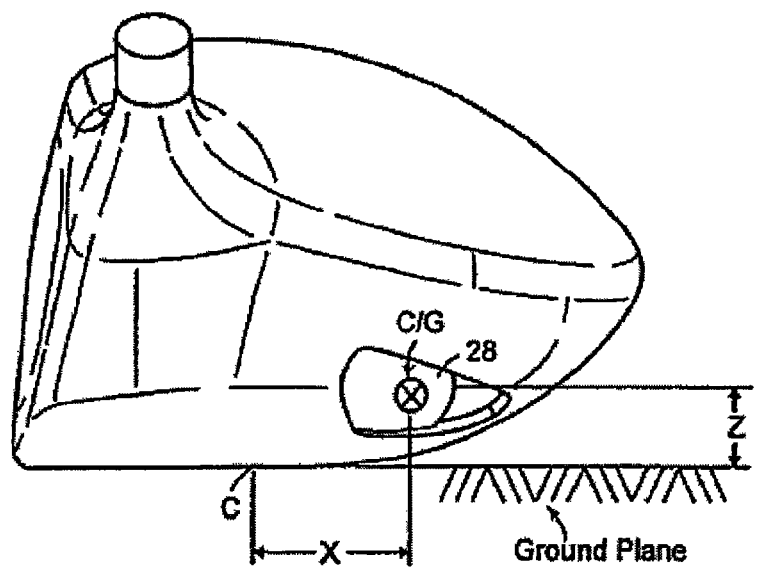
FIG. 7 shows a heel elevation view of the club head of FIG. 5.

FIG. 3 shows a cross-sectional view taken substantially perpendicular to the face 11 of a second club head 2 of the present invention, and FIG. 4 shows a bottom view of the club head 2. In the illustration of this embodiment, the concave portion 20 is positioned at the back of the club head 2. The concave portion 20 preferably is not visible to the golfer at address. In addition to the concave portion 20, the second body member 102 further includes a convex bulge 22 that extends generally away from the interior volume 16.

At least one insert 23 may be positioned within the convex bulge 22. The insert 23 is not visible from outside the club head 2, and is thus illustrated using broken lines. In a preferred embodiment, the insert 23 is a weight insert. The convex nature of the bulge 23 allows the weight to be positioned to maximize the mechanical advantage it lends to the club head 2.

As shown in FIG. 4, the club head 2 may include a plurality of convex bulges 22, such as on a heel side and on a toe side of the club head 2. The club designer may place inserts 23 as desired within the bulges 22. The masses of the inserts may be substantially equal. Alternatively, one of the inserts may have a greater mass than the other. This may be beneficial to design the club to correct a hook swing or a slice swing. A preferred mass range for the weight insert 23 is from 1 gram to 50 grams.

As shown in FIG. 3, the first body member 101 may comprise a majority of the sole 12 and the second body member 102 may include a majority of the crown 13. This beneficially removes a large majority of the mass from the upper part of the club head 2. In this embodiment, the first body member 101 includes an attachment perimeter 18 that extends around its edge. The second body member 102 is coupled to the first body member 101 along the attachment perimeter 18. Thus, the first and second body members 101, 102 cooperatively define the interior volume 16.

The attachment perimeter 18 preferably may contain a step defining two attachment surfaces 18a, 18b. As illustrated, the second body member 102 may be coupled to both of these surfaces 18a, 18b to help ensure a strong bond between the body members 101, 102.

While the body members 101, 102 may be formed in a variety of manners, a preferred manner includes forming a complete club head shell (first body member 101) in known manner and removing material to create openings to which the second body member 102 can be coupled. The opening may be created in any desired manner, such as with a laser. The second body member 102 may be joined to the first body member 101 in a variety of manners, such as through bonding or through a snap-fit in conjunction with bonding. If a composite material is used for the concave inserts, molding six plies of 0/90/45/-45/90/0 is preferred.

FIGS. 5-9 illustrate additional aspects of the present invention. In the embodiment illustrated in these figures, the club head 1 includes a crown portion 13, a sole 12, a heel portion H, a toe portion T, a skirt portion 14 connecting the heel portion H to the toe portion T, a front face 11 and a hosel 24 that extends from the heel portion H. The club head 1 can be formed from sheets joined together, such as by welding, or cast, preferably from a titanium alloy. The crown portion 13 can be made from such materials as carbon fiber composite, polypropylene, Kevlar, magnesium, continuous fiber reinforced thermoplastic, BMC, or a thermoplastic. Hosel 24 includes a bore defining a centerline axis C/L.

Figure 8:
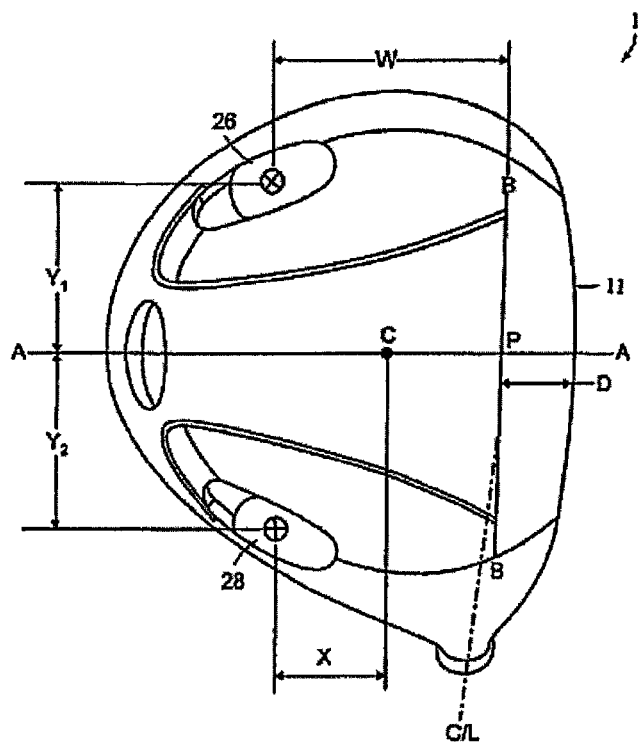
FIG. 8 shows a bottom schematic view of the club head of FIG. 5.
Figure 9:
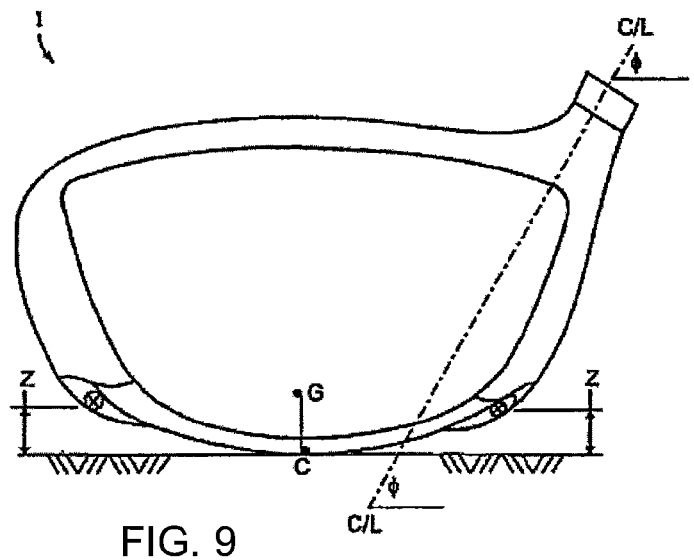
FIG. 9 shows a front cross-sectional view of the club head of FIG. 5.

As best depicted in FIG. 9, the club head 1 of the present invention has a center of gravity G located at an extremely rearward and low position. The location of the center of gravity G is biased by the location of two secondary weights, a toe secondary weight 26 and a heel secondary weight 28, which are both partially outside the traditional look of a golf club head. As shown in FIGS. 5-9, the locations of the two secondary weight elements 26, 28 are established by the relationship of their distances from established points of contact. When the club head is at a lie angle φ of 59°, the lowest contact point of the sole 12 is at a center point C directly beneath the center of gravity G.

One method of establishing the locations of the secondary weights 26, 28 is discussed herein. As shown in FIG. 8, the center line C/L of hosel 24 intersects the sole plate 12 at a distance D from the rear surface of the front face 11. When extending a line B-B that is substantially parallel to the leading edge of the club head (maintaining the distance D), an intersection point P is made with a line A-A that is perpendicular to and extends rearward from the midpoint of the front face 11. The line A-A extends through the middle of the club head 1 and passes directly beneath the club head center of gravity G. This intersection point P may also be defined by the intersection of line A-A and a vertical plane positioned at an intersection of the hosel center line C/L and the sole 12.

The center of gravity C/G of each secondary weight 26, 28 is at a distance W of at least 1.50 inches rearward of the intersection point P, a distance Z that is a maximum of 0.25 inch above the lowest point of contact, which is the center point C of the sole plate 12 and each secondary weight is at least about 0.75 inch away from line A-A in opposing directions, which is a distance Y1 towards the toe T for the toe secondary weight 26 and a distance Y2 towards the heel H for the heel secondary weight 28.

The locations of the secondary weights 26, 28 may also be determined for the present invention by measuring from the center point C. From center point C, the center of gravity of each secondary weight 26, 28 is a distance X of at least about 0.50 inch rearward along line A-A, the distance Z that is a maximum of about 0.25 inch above the center point C, and a minimum of about 0.75 inch away from line A-A in opposing directions, towards the toe T for the toe secondary weight 26 and towards the heel H for the heel secondary weight 28. Thus, each secondary weight 26, 28 is a minimum of about 0.90 inch from the center point C.

The secondary weights 26, 28 can be selected from a plurality of weights designed to make specific adjustments to the club head weight. The secondary weights 26, 28 can be welded into place or attached by a bonding agent. The weights 26, 28 can be formed from typically heavy weight inserts such as steel, nickel, or tungsten. Preferably, the body of the club head 1 is formed from titanium, and the crown portion 13 from a light-weight material such as carbon fiber composite, polypropylene, Kevlar, thermoplastic, BMC, magnesium, or some other suitable light-weight material.

Preferred volumes of the club head 1 include from 350 cc to 460 cc. The secondary weights 26, 28 preferably range in mass from 2 to 35 grams, with 10 grams to 35 grams being more preferred. It is well known that by varying parameters such as shaft flex points, weights and stiffness, face angles, and club lofts, it is possible to accommodate a wide spectrum of golfers. But the present invention addresses the most important launch consideration, which is to optimize the club head mass properties (center of gravity and moment of inertia) by creating a center of gravity that is low, rearward, and wide of center. The club head 1 of the present invention encompasses areas of the club head that are not typically utilized for weighting because they adversely alter the traditional look of a club head. The design of this club head 1 allows for a portion of the secondary weights 26, 28 to bulge outside the normal contour of the club head.

Figure 10:
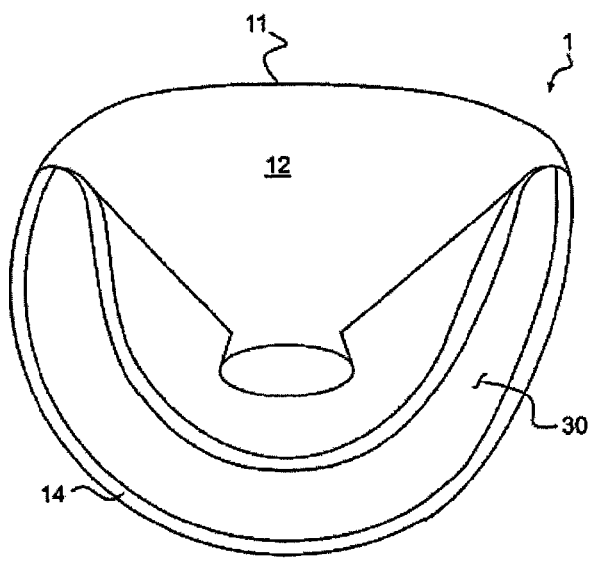
FIG. 10 shows a bottom view of a golf club head of the present invention.
Figure 10:
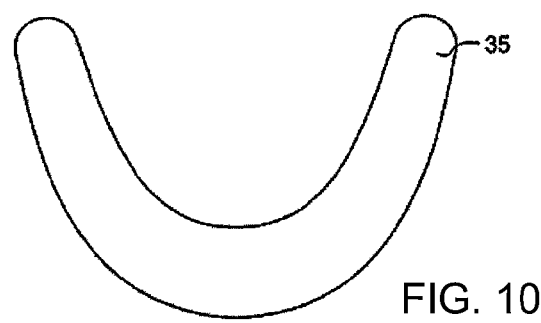

FIG. 10 shows a bottom view of a golf club head 1 of the present invention. The skirt 14 includes an opening 30 towards the rear of the club head 1. An insert 35 is positioned within the opening 30 in known fashion, such as via an attachment perimeter 18, to cooperatively define the interior volume 16. Preferably, the insert 35 is formed of a light-weight material such as a composite material or a polymer material. Using a light-weight insert 35 inherently biases the club head mass toward the sole 12 of the club head 1. It also allows the inclusion of a weight member to achieve a specific moment of inertia and/or center of gravity location while maintaining typical values for the overall club head weight and mass.

Figure 11:
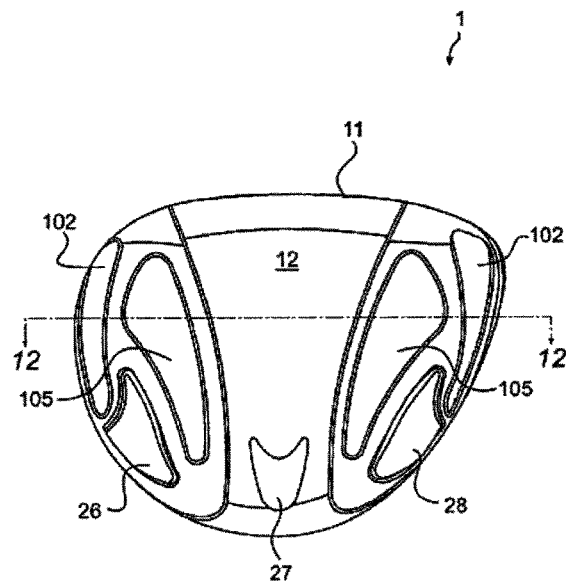
FIG. 11 shows a bottom view of a golf club head of the present invention.

FIG. 11 shows a bottom view of a golf club head 1 of the present invention. In addition to secondary weights 26, 28, the club head 1 includes an insert 27 intermediate the toe secondary weight 26 and the heel secondary weight 28. The insert 27 may be a weight insert similar to the toe and heel secondary weights 26, 28, in which case it also has a preferable mass range of 2 to 35 grams. Alternatively, or in addition to being a weight member, insert 27 may include one or more indicia, such as a model or manufacturer designation.

The club head 1 further includes a sole insert 105; in the illustrated embodiment, two such sole inserts 105 are shown. These inserts 105 preferably are formed of a light-weight material as described above. Such materials likely are robust enough to withstand contact with the ground such as the sole 12 incurs through normal use of the golf club. However, the arcuate shape of the sole 12 in the illustrated embodiment minimizes the likelihood of the inserts 105 contacting the ground. Inclusion of the sole inserts 105 frees even more mass for more beneficial placement in the club head, such as at toe insert 26, intermediate insert 27, and/or heel insert 28. The location of the inserts 105 toward the center of the sole 12 inherently biases the mass toward the outer portions of the club head 1, improving the club head MOI.

Figure 12:
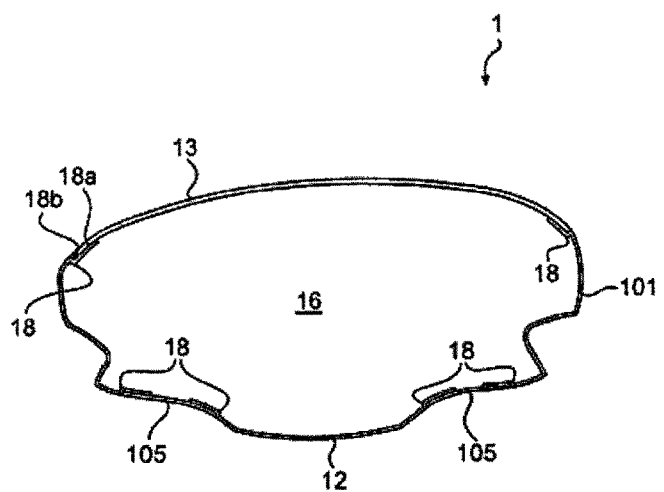
FIG. 12 shows a cross-sectional view of the club head of FIG. 11 taken along line 12-12.

FIG. 12 shows a cross-sectional view of the club head 1 of FIG. 11 taken along line 12-12. Here it is seen that the crown 13 is an insert that is coupled to the metallic first body member 101. The crown insert 13 preferably is formed of a light-weight material, beneficially displacing the club head center of gravity downward and freeing yet more weight for more beneficial placement elsewhere without increasing the overall weight of the club head 1. Due to the inclusion of holes in which to position the crown insert 13, the skirt insert 35, the second body member inserts 102, and the sole inserts 105, the first body member 101 takes on the appearance of a frame.

It should be noted that not every insert 13, 35, 102, 105 need be included in a particular embodiment of the present invention, though all may be present. The frame-like nature of first body member 101 is a load bearing structure that ensures that the stresses and strains incurred during a golf swing, including those generated through striking a golf ball or the ground, do not detrimentally affect the light-weight portions of the club head 1, which experience a reduced level of stress and strain. These club head portions, which may include secondary body member 102, crown 13, skirt insert 35, and sole inserts 105, advantageously can be formed of a lighter, weight-efficient secondary material such as low density metal alloys, plastics, composites, and the like, which have a lower density or equivalent density than the previously mentioned metallic materials, beneficially allowing the club head designer to redistribute the "saved" weight or mass to other, more beneficial locations of the club head 1. These portions of the club head 1 can also be made thinner, enhancing the weight savings.

The first body member 101 preferably includes an attachment perimeter 18 for each insert (including the crown 13). These attachment perimeters 18 extend around the edge of the respective openings. Preferably, each attachment perimeter 18 includes a step defining two attachment surfaces 18*a*, 18*b*, which provide additional assurance of a strong bond between the respective club head components. (While each attachment perimeter 18 of FIG. 12 includes a step defining two attachment surfaces 18*a*, 18*b*, such attachment surfaces 18*a*, 18*b* are called-out in only one location for the sake of clarity.)

The openings in the club head 1 into which the inserts 13, 35, 102, 105 are positioned preferably may be created by forming a complete club head shell in known fashion, and then creating the openings therein. One preferred method of creating the openings is by using a laser to remove portions of the metallic material of the first body member 101. This method provides for tight tolerances. The attachment perimeter 18, including attachment surfaces 18*a*, 18*b*, may be formed in a variety of manners, such as machining the first body member 101 after laser cutting the opening in the club head 1.

Each sole insert 105 preferably has a mass of 0.5 gram to 10 grams, and more preferably from 1 gram to 5 grams. The sole inserts 305, as well as the other inserts, may be beveled or stepped slightly to provide a location for any excess adhesive. In one embodiment, the toe and heel sole inserts 26, 28 each have a preferred mass range of 4 grams to 7 grams, while the intermediate insert sole 27 has a preferred mass range of 2 grams to 3 grams. In one embodiment, the thickness of the club head components is tapered such that the walls are thicker towards the face 11 and thinner towards the rear of the club head 1. Such wall thickness tapering frees more mass for more beneficial placement in the club head 1.

As discussed above, certain golf club head geometries have an inherent advantage over typical design shapes with respect to the club head's mass properties, especially in view of the dimension limits mandated by the United States Golf Association (USGA) and the Royal and Ancient Golf Club of St. Andrews (R&A), the governing bodies promulgating the Rules of Golf. Two such properties of particular note are the club head center of gravity (CG) height and the club head MOI in the heel/toe twisting direction about a vertical axis passing through the CG. (The limit for this MOI is 5900 g·cm².)

Further to the discussion above, material selection and distribution plays an important role in determining the club head properties, including these two specific properties.

Modern drivers have gone from predominately made of steel in the 1990s to titanium alloys in the 2000s as the driver size, measured by volume, have gone from around 250 cc to the maximum allowed 460 cc. While maintaining a certain volume as a constant, the surface area of the club head may be varied. A sphere would be the smallest body for a given volume, while a rectangle with twice the footprint can have the same volume as the sphere. For example, a sphere has a minimum amount of surface area surrounding a given volume while the rectangle has a much greater amount of surface area. With that logic, and the fact that there are inherent limits to how thin walls can be made using certain metals—and furthermore if the walls do reach the desired minimal thickness, secondary durability issues, such as denting, arise—certain materials reach their practical limit. While stiffening ribs can be added to help overcome denting, this becomes a complex and costly solution and may offer only marginal improvement.

Considering for example titanium, which has a density of approximately 4.43 gm/cc, current manufacturing techniques can obtain wall thickness in the range of 0.5-0.7 mm at a reasonable cost. For a "traditional" shaped profile for a 460 cc driver approaching the Rule limits in width and depth of 12.7 cm, the surface area (SA) required is approximately 380 cm². Using a wall thickness of 0.06 cm, the minimum amount material of titanium required is 101 g titanium (calculated as area·thickness·density). However, certain areas of the club need to be substantially thicker than the minimum wall thickness for a variety of reasons. One such area is the face 11. Variable face thicknesses are typical in modern drivers, with thicknesses ranging from about 0.2 cm near the outer periphery and up to 0.4 cm or more in the central region. Most face areas do not approach the Rule limit of 12.7 cm (5 in)×7.1 cm (2.8 in), which represents a SA of 90 cm². Certain drivers manufactured by Cobra Golf have a large face area, measuring around 54 cm2. Assuming for calculation purposes that a uniform thickness of 0.28 cm is used for the face to achieve its functional requirements, then 67 g of titanium is needed for the face. Thus the total amount of titanium used is:

$$\begin{aligned}\text{Total amount} &= \text{face mass} + \text{body mass} \\ &= (\text{face } SA \cdot \text{face thickness} \cdot \text{density}) + \\ &\quad [(\text{body } SA - \text{face } SA) \cdot \text{body thickness} \cdot \\ &\quad \text{density}] \\ &= (54 \text{ cm}^2 \cdot 0.28 \text{ cm} \cdot 4.43 \text{ g/cc}) + \\ &\quad [(380 \text{ cm}^2 - 54 \text{ cm}^2) \cdot 0.06 \text{ cm} \cdot 4.43 \text{ g/cc}] \\ &= 67 \text{ g} + 86.6 \text{ g} \\ &= 153.6 \text{ g}\end{aligned}$$

For current driver club building specifications having a shaft length of 45.5 in, the overall club head mass is about 200 g. The amount of free mass is thus 46.4 g to optimize certain playing characteristics. Furthermore, the maximum shaft length allowed by the Rules is 48 in, and when shafts are lengthened the heads traditionally become lighter. A rule of thumb is that for every 0.5 in shaft length increase, the head mass must decrease by 5 g. Thus, with a 48 in. shaft, the maximum mass for the club head is 175 g, leaving little discretionary mass for the club head designer to manipulate.

Increasing the face area to the maximum allowable value enhances the playability of the resulting golf club, but presents additional challenges to the club head designer. Namely, the inventive golf club head is contoured to control the club head attributes and volume, which increases the club head body SA. At the same time, the face thickness would most likely need to be increased to maintain its functional requirements. For quick calculations, the following assumptions are made: face SA=76 cm², face thickness=0.34 cm, body SA=400 cm², and body thickness=0.06 cm. This results in a club head mass of 200 g, virtually eliminating discretionary mass available to the club head designer for strategically weighting the club head.

This suggests that there is a limit to how much surface area of the club head can be provided in titanium. One aspect of the instant invention is the use of lightweight metallic materials with densities less than 4.0 g/cc as the primary or only (including alloys) material for both the face and body in heads with large volumes (i.e., greater than 400 cc), large overall surface areas (i.e., greater than 350 cm$^2$), large face areas (i.e., greater than 60 cm$^2$), and plan profiles approaching the Rule limits (12.7 cm heel-toe distance, less than 12.7 cm face-back distance). As used herein, plan profile means the smallest rectangle that can be drawn around the widest toe-heel and front-back dimensions of the club head projected onto a plane. The plan profile defines a side wall ratio, which is defined as the widest toe-heel dimension divided by the widest front-back dimension. Preferably, the club head has a plan profile area of at least 130 cm$^2$, and more preferably at least 145 cm$^2$. The inventive club, having these dimensions and materials, has increased forgiveness and increased playability for golfers of various skill levels.

Preferred materials for the inventive club head include aluminum, its alloys, metal matrix aluminum composites, aluminum cermets (ceramic-reinforced metals), and the like. Such materials may have material strengths that are comparable to the widely used titanium alloys. Use of such materials have a density less than 3 g/cc, yielding a lower total club head mass even with increased wall thicknesses. For example, using such an aluminum-based material having a density of 2.8 to form the body and face of a golf club head having an overall surface area of 400 cm$^2$, the face having a surface area of 76 cm$^2$ and a thickness of 0.4 cm, and the body having a thickness of 0.1 cm, the total club head mass is about 175.8 g. This represents a "savings" of more than 24 g relative a titanium-based club head. The club head designer may use this saved mass to strategically position weight members to the club head, increasing the club head MOI, lowering the club head CG, and enhancing the forgiveness and playability of the resulting golf club.

Figure 13:
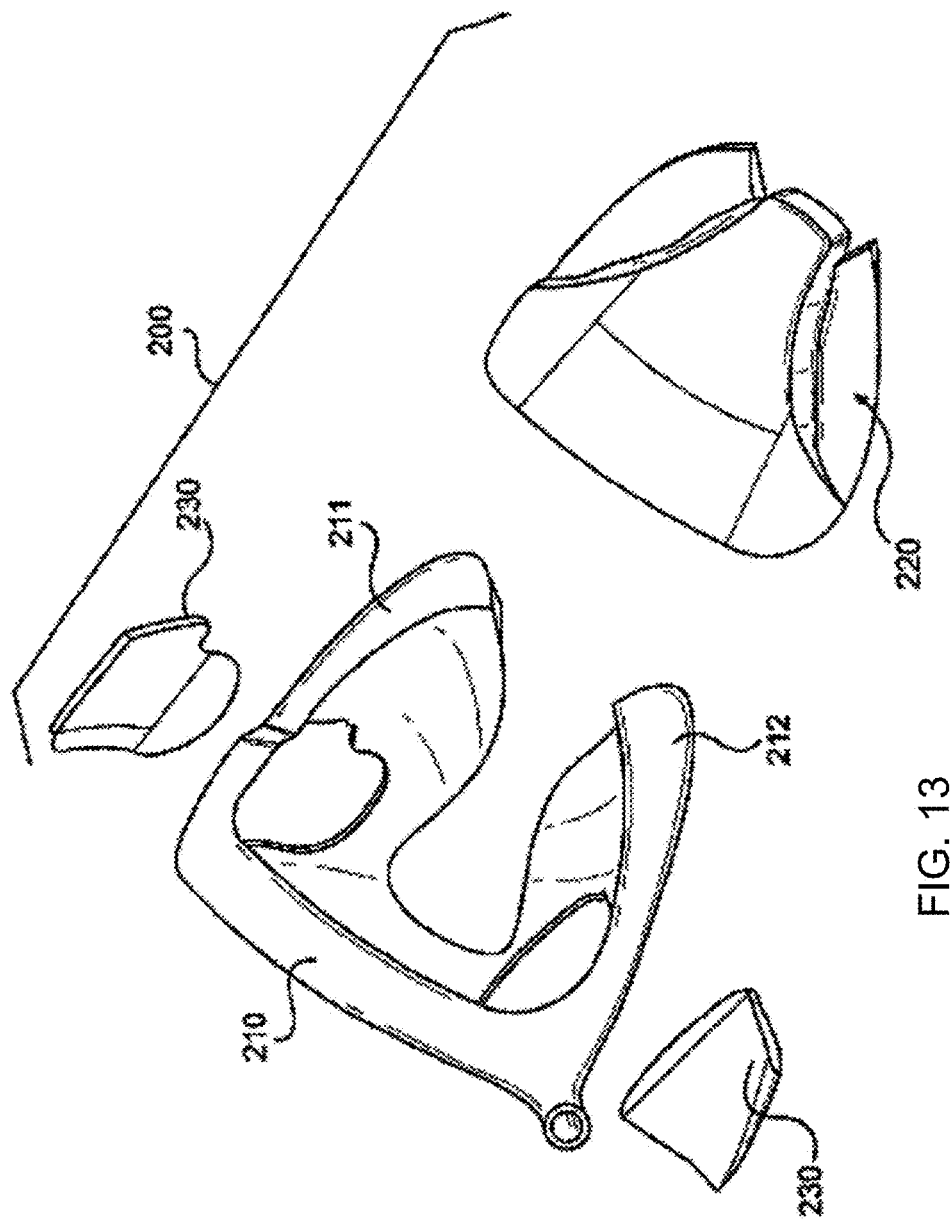
FIG. 13 shows an exploded top view of a golf club head of the present invention.

In an alternate version of the inventive club head, a combination of a relatively heavier material and a lightweight material is used to form the club head body. FIG. 13 shows an exploded top view of a golf club head 200 of the present invention. The club head 200 includes a body formed of two major components. A first component 210 is formed of a relatively heavier material, preferably a metallic material, and includes the strike face 11, which may be an insert or formed integrally therewith. The metallic component 210 further includes wing-like projections 211, 212 extending rearward from toe and heel portions of the face 11, respectively, partially forming the skirt 14 of the club head 200. The wing extensions 211, 212 define voids therebetween, including in crown and sole portions of the club head. Thus, the metallic component 210 has a frame-like design.

A second major component 220 is formed of a lightweight material and cooperates with the metallic component 210 to define the club head 200. Preferred materials for the second component 220 include reinforced plastic and other composites. The first and second components 210, 220 are coupled together in known manner, such as through an adhesive, epoxy, or the like. The components 210, 220 can also be coupled via bladder molding or welding. To facilitate their attachment, the components 210, 220 have corresponding attachment surfaces. Preferably, at least the top, outer surfaces of the projections 211, 212 and corresponding surfaces of the lightweight component 220 are such attachment surfaces. Preferably, at least portions of the bottom, outer surfaces of the projections 211, 212 and corresponding surfaces of the lightweight component 220 are also attachment surfaces.

Figure 14:
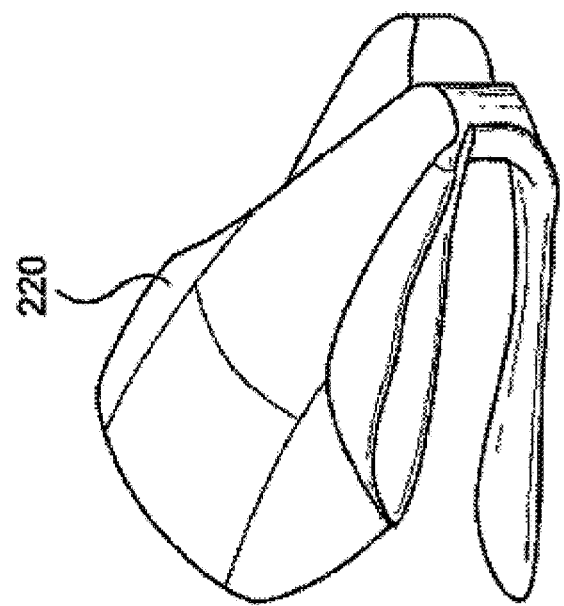
FIG. 14 shows an exploded top view of the golf club head of FIG. 13.
Figure 14:
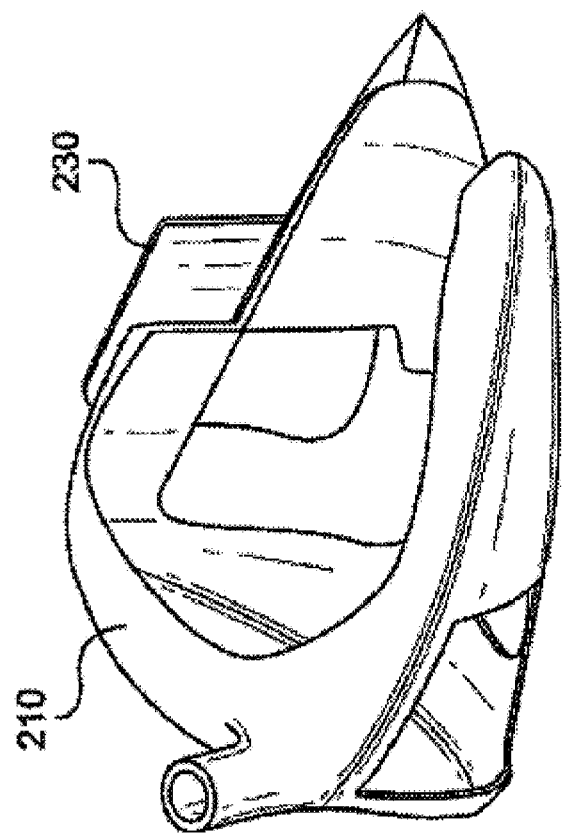

The lightweight component 220 fills in the voids of the metallic component 210. Thus, the lightweight component forms a majority of the crown 13, a rear portion of the skirt 14, and a central portion of the sole 12. This is illustrated in FIG. 14, which shows an exploded side view of the club head 200. By displacing the denser metallic material from the crown, the center of gravity is inherently lowered. Similarly, by displacing the metallic material from the central portion of the sole 13, mass is inherently biased toward the heel and toe of the club head.

Similarly to the second body member 102 discussed above, the club head 200 may further include additional lightweight bodies 230 positioned in front heel and toe portions of the skirt 14, near the strike face 11. Inclusion of such additional lightweight components displaces further metallic material, further allowing the club designer to enhance the playing characteristics of the golf club.

One way to characterize the relative amounts of each material is by a ratio of the surface area comprised by the relatively heavier material and that comprised by the lightweight material. It should be noted that, preferably, the "relatively heavier material" is less dense than the metallic materials typically used to form golf club heads. The aluminum materials discussed above are preferred for the "heavy" material, and carbon fiber or otherwise reinforced plastic composites are preferred for the lightweight material. The surface area ratio may be compared with a ratio of the densities of the two club head components 210, 220. According to one preferred arrangement, $$\frac{A_2}{A_1} < \frac{\rho_1}{\rho_2} < 5 \cdot \frac{A_2}{A_1},$$

where $A_1$ is the surface area of the first component 210, $A_2$ is the surface area of the second component 220, p1 is the density of the first component 210, and p2 is the density of the second component 220. It is the outer surface areas that are being referred to here. More preferably, $$\frac{A_2}{A_1} < \frac{\rho_1}{\rho_2} < 3 \cdot \frac{A_2}{A_1}.$$

Thus, the inventive club head 200 balances the amount of the relatively heavier material (measured as a function of its surface area) with the relative densities of the components 210, 200. Preferably, the first density p1 is less than or equal to 3.5, and the first density p1 divided by the second density p2 is less than 2. The greater the difference in relative densities, the greater is the difference in surface areas. This is an inverse relationship, which an increase in the difference in densities causing a decrease in the surface area comprised by the heavier material.

Figure 15:
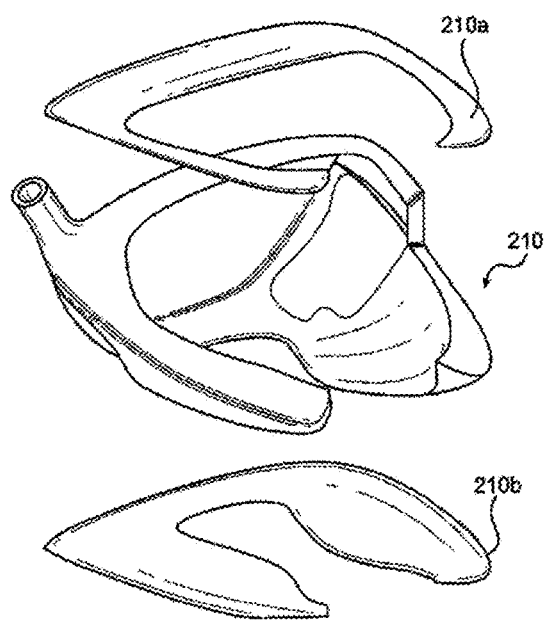
FIG. 15 shows a first club head component and its projected area.
Figure 16:
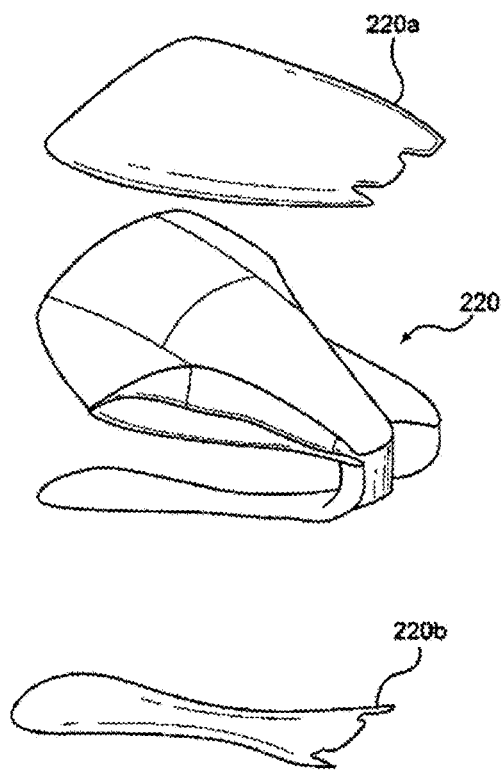
FIG. 16 shows a second club head component and its projected area.

In addition to the amounts of material present in the club head, the present invention additionally controls the placement of the different materials. This material placement aspect may be quantified as a ratio of projected surface area to actual surface area. That is, for a given portion of the club head, the outer surface area of each component 210, 200 forming the club head is projected onto a horizontal plane. FIGS. 15 and 16 illustrate this concept. FIG. 15 shows the heavier first club head component 210. The projected surface area 210a shown above the first club head component 210 is a projection onto a horizontal plane of that portion of the component 210 above the crown parting line of the club head components 210, 220. The projected area 210b shown below the first club head component 210 is a projection onto a horizontal plane of that portion of the component 210 below the parting line. The projected area for the first club head component 210 is the sum of these partial projections 210a, 210b. The parting line is a convenient location to use to separate the relative club head "halves," though it is not the only such location available. Similarly, FIG. 16 shows the lighter second club head component 220 with a first projected area 220a of that portion of the component 220 above the parting line and a second projected area 220b of that portion of the component 220 below the parting line. The projected area for the second club head component 220 is the sum of these partial projections 220a, 220b.

Due to the contoured nature of the club head, the club head body surface area is increased and the projected area is less than the actual surface area. Preferably, the ratio of projected area divided by actual area is 0.8 or less, and more preferably this ratio is 0.7 or less.

The concept of equivalent density is useful in describing the inventive club head 200. The equivalent density is calculated as the density of the material forming each component as a percentage of the surface area for the component relative the total surface area:

$$\rho_{eq} = \frac{\rho_1 \cdot A_1 + \rho_2 \cdot A_2}{A_1 + A_2}$$

where $\rho_{eq}$ is the equivalent density and the other terms are as defined above.

Figure 17:
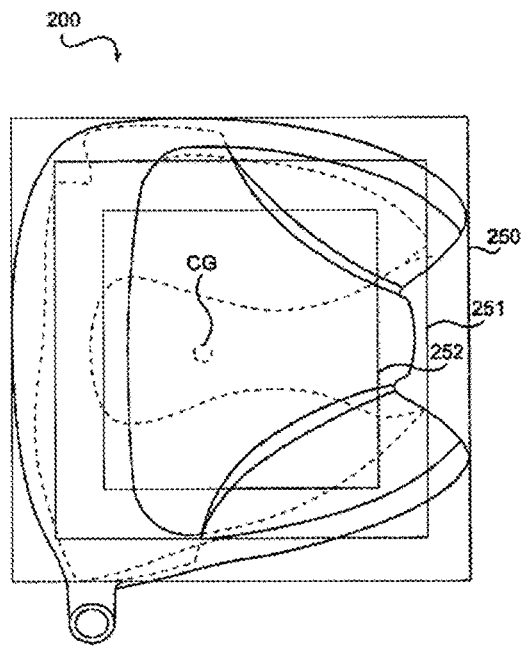
FIG. 17 shows a top view of the club head of FIG. 13.
Figure 18:
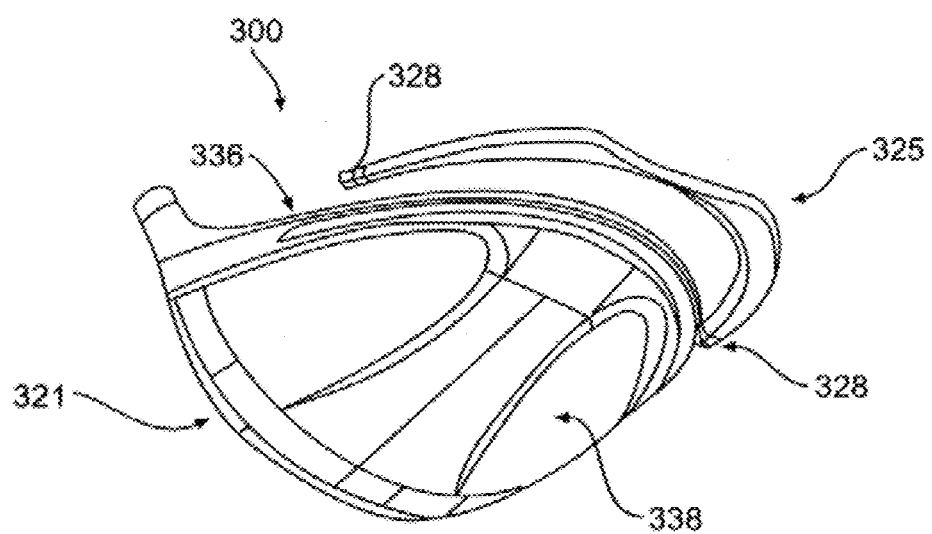
FIG. 18 shows a club head of the invention with an adjustable insert.
Figure 19:
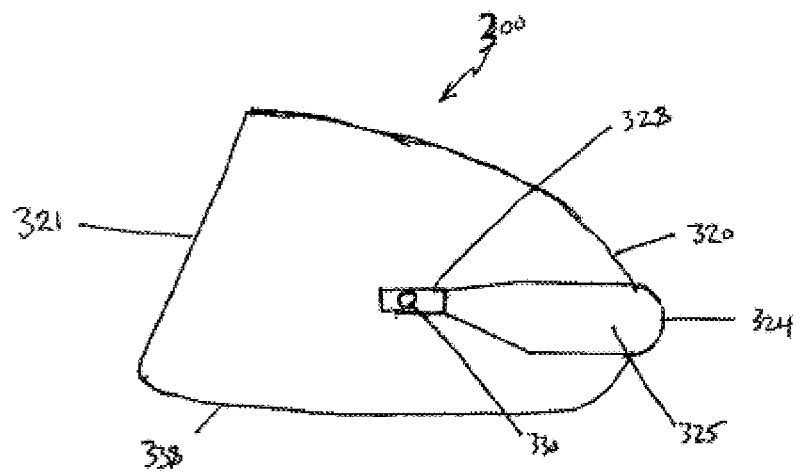
FIG. 19 is a toe side view of the golf club head shown in FIG. 18.
Figure 20:
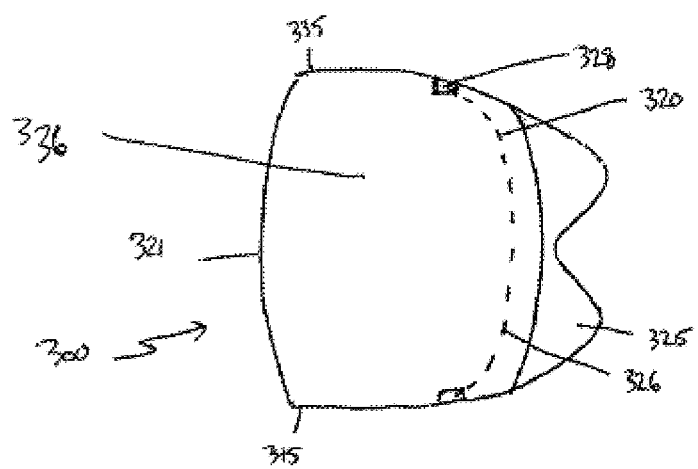
FIG. 20 is a top view of the golf club head of the club head of FIG. 18.
Figure 21:
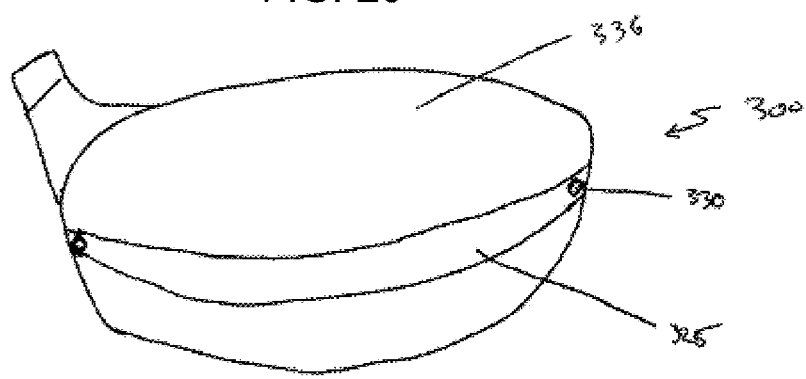
FIG. 21 is a rear view of the golf club head of the club head of FIG. 18.

Of course, equivalent density can be calculated for the entire club head and for specific portions of the club head. FIG. 17 shows a top view of the club head 200 and its plan profile 250. Two additional plan profiles 251, 252 are also shown, with all of the plan profiles 250, 251, 252 having geometric centers that are coincident. Plan profile 251 has an area equal to 90% of the first plan profile 250 area, and plan profile 252 has an area equal to 80% of the first plan profile 250 area. Each of these secondary plan profiles 251, 252 has the same side wall ratio as the primary plan profile 250. Preferably, the inventive golf club head has an equivalent density of less than 2 within the 80% plan profile 252. Preferably, the inventive golf club head also has an equivalent density of greater than 2 between the 90% plan profile 251 and the primary plan profile 250. In another aspect of the present invention, this equivalent density between the 90% plan profile 251 and the primary plan profile 250 is greater than 3, or greater than 4.

Table 2 below shows the attributes of one example of the inventive golf club head 200 and a known golf club head:

TABLE 2

|  | Example | Comparative |
| --- | --- | --- |
| Main Body | | |
| ρ | 2.7 | 4.43 |
| SA | 170 | 270 |
| Lightweight insert | | |
| ρ | 1.5 | 1.5 |

TABLE 2-continued

|  | Example | Comparative |
| --- | --- | --- |
| SA | 290 | 110 |
| Club Head | | |
| SA | 460 | 380 |
| $SA_L/SA_H$ | 1.7 | 0.41 |
| $\rho_H/\rho_L$ | 1.8 | 2.95 | where density ρ is in g/cm³, surface area SA is in cm², H designates the heavier material, and L designates the lighter material. As shown, the properties of the inventive club head are an improvement over known club heads.

The strike face 11 may be integral with or an insert attached to the first component 210. If an insert, the strike face may be formed of the same material as the first component 210. Alternatively, the face insert may be formed of a different material, such as titanium or a titanium alloy. Thus, the density of the face may be greater than the density of any of the body components.

More than one light-weight material can be used with the inventive golf club head. These components may also be comprised of layers of various light-weight materials. If so, the densities, surface areas, and other attributes mentioned herein are of the actual inserts used rather than just one of the various materials used.

Additionally, the light-weight components of the club head may be treated with a metallic coating to improve their wear resistance. Other coatings may also be used. Preferably, the coating is chosen such that it has only a minor impact, if any, on the club head attributes.

As used herein, directional references such as rear, front, lower, etc. are made with respect to the club head when grounded at the address position. See, for example, FIG. 9. The direction references are included to facilitate comprehension of the inventive concepts disclosed herein, and should not be read or interpreted as limiting.

Adjustable Inserts

Another way to alter the golf club head to maximize the playability of the club is to maximize the dimensions. For example, a club designer may desire to have the distance from the face to the back (FB) set as close as possible to the distance from the heel to the toe (HT). Without being bound to any particular theory, it may not be desirable for FB to exceed HT.

While the current trend in golf club manufacturing is to maximize the dimensions of the golf club to take advantage of the various physical properties allowed by a larger club head, due to manufacturing tolerances, it is not practical in terms of time, labor, or expense to set the face to back (FB) distance near the heel to toe (HT) distance. Thus, traditional methods of manufacturing have set the target manufacturing level of the face to back distance (FB) considerably less than the heel to toe distance (HT), to remove the tolerance consideration.

However, the adjustable insert contemplated by the inventors allows distance in the face-to-back direction to be maximized by setting the target manufacturing level sufficiently below the HT distance to remove the tolerance considerations while providing a means for adjusting the overall length from face-to-back to approach HT distance. In addition, positioning the insert at the rear of the club and constructing at least a portion of the insert out of a high specific gravity material serves to move the center of gravity of the club head away from the face.

The relationship between the distance from the face to the back of the club head with the insert at its maximum extension (MFB) to the distance from the heel to the toe (HT) may be described by the following equations:

$$MFB \geq HT*1.10 \quad \quad 1)$$

$$MFB \geq HT*1.05 \quad \quad 2)$$

$$MFB \geq HT*1.00 \quad \quad 3)$$

By allowing for the MFB to be greater than the HT, the player is ensured that the club head will have the ability to reach the HT distance. The player may then adjust the insert to ensure that the HT is greater than the MFB, if so desired.

In the alternative, adjustability of the insert may be expressed as a relationship between the distance from the face to the back of the club head with no insert (XFB) to the distance from the face to the back of the club head with the insert at its maximum extension (MFB). For example:

$$MFB \geq XFB*1.50 \quad \quad 4)$$

$$MFB \geq XFB*1.25 \quad \quad 5)$$

$$MFB \geq XFB*1.10 \quad \quad 6)$$

$$MFB \geq XFB*1.05 \quad \quad 7)$$

FIGS. 18-21 illustrate various adjustable inserts according to the invention. For example, golf club head 300 is comprised of a face 321, a back 320, a heel 345, a crown 336, an adjustable insert 325, an adjustment mechanism 328, a locking mechanism 330, and a sole 338. In particular, FIGS. 18-19 demonstrate a weight insert 325 coupled to golf club head 300. Insert 325 is attached to golf club head 300 by way of adjustment mechanism 328 and locking mechanism 330. In the unlocked position, the insert 325 is capable of movement in the several directions. For example, the insert 325 may be adjusted in a direction from face to back. In the alternative (or in addition to this adjustment), the insert 325 may be adjusted vertically from crown to sole. In the locked position, the insert is incapable of movement.

Insert 325 may be composed of a single material or a combination of multiple materials. In one embodiment, at least a portion of the insert is composed of a material with a higher specific gravity than the material of the body. For example, the specific gravity of all or a portion of the insert may be about 5 or more, preferably about 7 or more, and more preferably about 9 or more. In comparison to the specific gravity of the body components, the specific gravity of at least a portion of the insert may be greater than the specific gravity of the body by about 4 or more, preferably by about 5 or more, and even more preferably by about 7 or more.

In one embodiment, the portion of the insert with a higher specific gravity may be less than about 50 percent of the total volume of the insert. In another embodiment, the high specific gravity portion is less than about 40 percent of the total volume of the insert. In still another embodiment, the high specific gravity portion accounts for less than about 20 percent of the total volume of the insert. In the alternative, the insert in its entirety may have a specific gravity that exceeds that of the specific gravity of the body.

In one embodiment, the portion of the insert with a higher specific gravity than the body is aligned with the horizontal center of the club face when the club is at an address position. In another embodiment, the high specific gravity portion may be biased toward either the toe or the heel of the club head. Biasing the high specific gravity portion toward either the heel or the toe allows for a golfer with a hook or slice swing to obtain a center of gravity of the club head that will accommodate the golfer's swing.

Suitable materials for the high specific gravity portion of the insert include, but are not limited to, tungsten and alloys thereof, tungsten loaded polymer, nickel, copper, steel, gold, platinum, depleted uranium, and combinations thereof.

Alternatively, the insert 325 or at least a portion of the insert 325 may be composed of a low specific gravity material. In this aspect of the invention, the specific gravity of at least a portion of the insert is equal to or less than the specific gravity of the body. For example, the specific gravity of all or a portion of the insert may be less than about 4, preferably less than about 3, and more preferably less than about 1.5.

In one embodiment, the portion of the insert with a low specific gravity may be less than about 40 percent of the total volume of the insert. In another embodiment, the low specific gravity portion is less than about 30 percent of the total volume of the insert. In yet another embodiment, the low specific gravity portion makes less than about 20 percent of the total volume of the insert.

The portion of the insert with a low specific gravity may be aligned with the horizontal center of the club face when the club is at an address position. In another embodiment, the low specific gravity portion may be biased toward either the toe or the heel of the club head.

Suitable materials for the low specific gravity portion of the insert include, but are not limited to, aluminum, aluminum alloys, magnesium, magnesium alloys, thermoplastics, thermosets, resins, epoxies, bulk molding compound, BMC material, or similar materials and combinations thereof.

The Adjustment Mechanism

The adjustment mechanism 328 may take a plurality of forms. For example, while not shown in detail, the adjustment mechanism 328 may be in the form of a series of notches at a receiving point on the body of club head 300 and deformable tabs that are located on the insert 325. Applying force to the insert 325 in the back to face direction causes the tabs to undergo elastic deformation when they come into contact with a notch. As the tab passes a notch the tab returns to its original shape, and the insert is successfully relocated closer to the face. A similar process ensues when the insert is pulled in the face to back direction, resulting in the insert relocated further from the face.

The adjustment mechanism 328 may also be in the form of a series of telescoping steps housed on the interior of the club head 300. For example, when insert 325 is compressed or pulled, the steps act similar to sections of a telescope, sliding past the next step allowing for the extension and compression of the insert in the face to back direction. The steps may be immobilized by a locking mechanism when insert 325 is at a desired location.

In another embodiment, adjustment mechanism 328 takes the form of a track and roller combination. For example, insert 325 may be coupled to a roller that is, in turn, located on a track. When the locking mechanism is disengaged, the golfer may simply slide insert 325 in toward the face or pull insert 325 away from the face to achieve the desired dimensions.

In still another embodiment, adjustment mechanism 328 may take the form of a receiving member located inside the club head and an elastically deformable portion of insert 325 folds similar to an accordion. When compressed, the accordion portion folds in on itself at regular intervals allowing insert 325 to move toward the face. When pulled, the deformable portion stretches to allow for insert 25 to move away from the face. In this aspect, the deformable portion may include less than about 10 percent of the total volume of insert 25. For example, in one embodiment, the deformable portion accounts for less than about 5 percent of the total volume of insert 325.

In yet another embodiment of the invention, the insert 325 may have a section that is elastically deformable. This deformable section engages a receiving portion on the club head that is tapered toward the face. Applying pressure from the back of the club toward the face results in the deformable section of the insert squeezing into the tapered section of the groove, and the insert is moved toward the face. Locking mechanism 330 keeps the deformable section from expanding back to its original length. Removing or loosening the locking mechanism allows for the deformable section to expand toward its original form, pushing the insert away from the face.

In another embodiment, one or more screws or other movement limiting fasteners may be used to adjust insert 325. For example, a screw may be received by a receiving member located inside the club head. Tightening the screw pulls the insert closer to the face. Alternatively, loosening the screw moves insert 325 further from the face. This adjustment mechanism has the added benefit of not requiring a locking mechanism.

Figure 22:
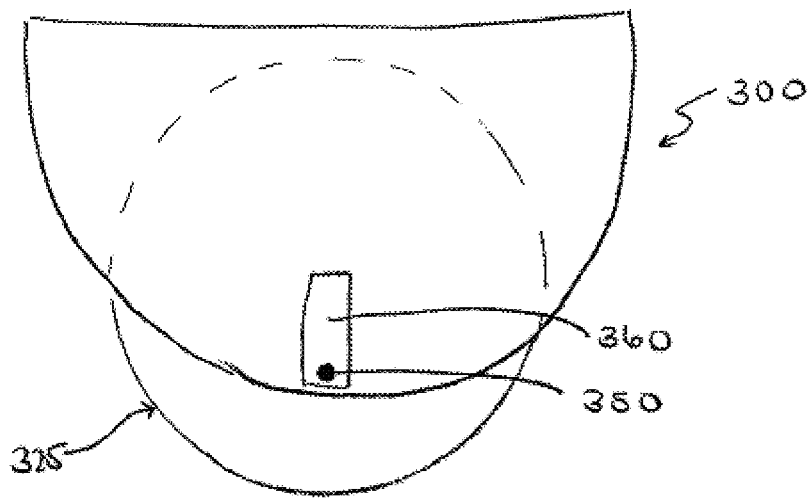
FIG. 22 is a top view of a club head of the invention with a fully extended adjustable insert.
Figure 23:
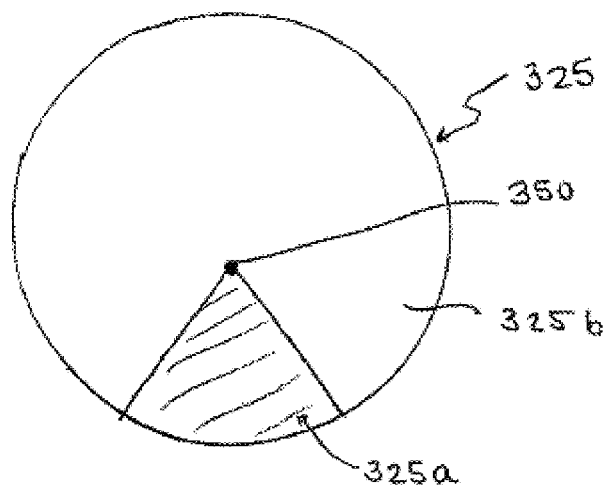
FIG. 23 shows the adjustable insert of FIG. 22 according to an embodiment of the invention.
Figure 24:
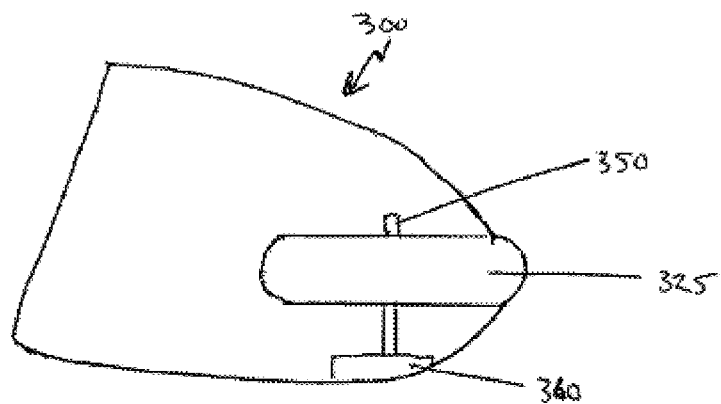
FIG. 24 is a side view of a club head of the invention with an adjustable insert.

In another embodiment shown in FIGS. 22-24, insert 325 is coupled to a center pin 350. The insert is preferably round and capable of rotation about center pin 350. Center pin 350 may be coupled to track 360 or similar device that allows for mobility in the face to back dimension. The track may have a locking mechanism, such as a set screw, that prevents the center pin from moving.

As shown in FIG. 23, insert 325 is made up of a portion 325a and portion 325b, where the portions 325a and 325b have different specific gravities. For example, 325a may have a higher specific gravity than the remainder of the insert and, more specifically, portion 325b. In addition, 325a may have a higher specific gravity than the body of the club head. The low specific gravity portion may account for at least about 50 percent of the total volume of the insert. In one embodiment, the low specific gravity portion makes up at least about 75 percent of the total volume of the insert. The low specific gravity portion 325b may have has a specific gravity of less than about 4, preferably less than about 3, and more preferably less than about 2. In this aspect of the invention, the high specific gravity portion 325a has a specific gravity greater than about 5, preferably greater than about 7, and most preferably greater than about 9. The golfer may rotate the insert to position the high specific gravity portion as desired.

In the alternative, the insert 325 is made up of a portion 325a and portion 325b, where the portion 325a has a lower specific gravity than the remainder of the insert and, more specifically, portion 325b. In addition, 325a may have a lower specific gravity than the body of the club head. The low specific gravity portion 325a may account for about 30 percent or less of the total volume of the insert. In one embodiment, the low specific gravity portion makes up at least about 20 percent of the total volume of the insert. The low specific gravity portion 325a may have has a specific gravity of less than about 4, preferably less than about 3, and more preferably less than about 2. In this aspect of the invention, the high specific gravity portion 325b has a specific gravity greater than about 7, preferably greater than about 9. The golfer may rotate the insert to position the low specific gravity portion as desired.

Figure 25:
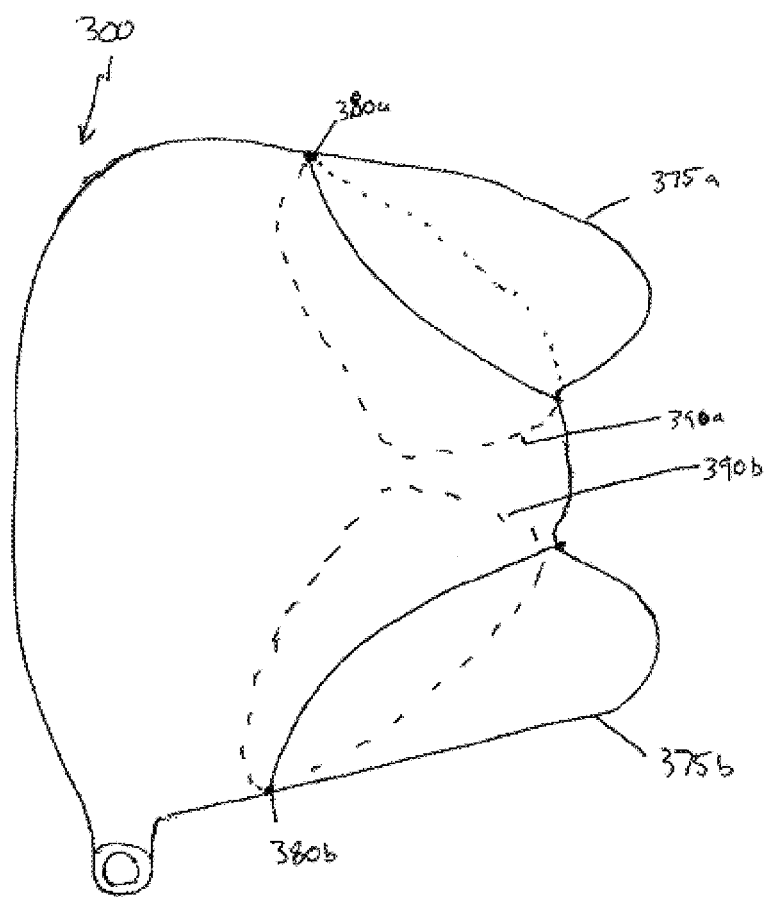
FIG. 25 shows a top view of a club head of the invention.

In another embodiment, shown generally in FIG. 25, two separate movable inserts may be coupled to the body by a rotatable hinge. For example, FIG. 25 shows inserts 375a and 375b attached to the inside of the body of the club 300 by hinges 380a and 380b. The hinge is lockable by the use of a locking mechanism such as a screw or other movement limiting fastener. Inserts 375a and 375b are able to move into the body of the club as desired by the golfer along the axis of hinge 380a and 380b. Dotted lines 390a and 390b indicate the position of the inserts 375a and 375b when fully compressed into the body.

In still another embodiment, insert 325 is removable. In this embodiment, the golfer is free to choose an insert configuration that conforms to his swing type. For example, a golfer may not wish to have a weighted insert, but would still prefer the option of maximizing the front to back dimension of the club head. In this aspect of the invention, the golfer would be able to select an insert formed solely from a low specific gravity material to allow for the maximization without adding significant weight to any part of the club. In another embodiment, the golfer may desire an insert with a particular mass distribution. For example, inserts may be weighted toward the heel or the toe.

The adjustable insert may be capable of a wide range of movement. For example, in one aspect of the invention the insert is capable of movement in less than about 0.05 inch increments. In another embodiment the insert is capable of movement in less than about 0.01 inch increments. The ability to move the insert in small increments allows the user to reach a target front to back distance with a higher precision.

The Locking Mechanism

Like the adjustment mechanism, locking mechanism 330 may take a variety of forms. For example, the locking mechanism may take the form of a screw. In this aspect of the invention, when the screw is turned in the particular direction, e.g., clockwise, it may act as a barrier to prevent the adjustment mechanism from moving.

In another embodiment, the locking mechanism may take the form of a peg that, when inserted into the adjustment mechanism, prevents movement of the adjustment mechanism. One of ordinary skill in the art would appreciate that there are many methods for preventing the movement of the adjustment mechanism that would be sufficient for use with the adjustable insert of the present invention. For example, screws, pegs, pins, clips, and other similar adjustable fasteners are all useful as locking mechanisms.

Preferably, the locking mechanism is accessed at a point on the bottom of the club to preserve the aesthetic quality of the club. Additionally, the locking mechanism may only be engaged through the use of a specialized tool designed specifically for use with the locking mechanism.

Spray Coating

As an alternative to or in combination with the weighted inserts and adjustable inserts above, any portion of the club head of the invention may be treated with a thermal or combustion spray coating to alter the weight distribution of the club head.

For example, certain designated portions of the golf club designed to have a high specific gravity may be spray coating according to this aspect of the invention. Examples of suitable materials for the spray include, but are not limited to, aluminum-oxide powders, tungsten-carbide powders, molybdenum based powder, tungsten powders, or similar materials and combinations thereof. In addition, various portions of the club head may have a spray coating from a first material and other various portions with a second material. The spray coating may be applied such that there are at least three portions of the club head sprayed with different coatings.

The spray coatings may include propellants as needed to disperse the materials with high specific gravity. The propellants may be compressed air or other gasses. In other instances, the coatings may be applied with electrospray. The spray coatings may include an adhesive component or the spray coatings may include a binder (vehicle) such as an alkyd, acrylic, vinyl-acrylics, vinyl acetate/ethylene (VAE), polyurethane, polyester, melamine, or epoxy (epoxide). In some instances, the spray coating will be air-cured, however the coatings could be cured with heat or with UV.

The specific gravity of the spray coating may be at least about 7. In one embodiment, the specific gravity of the spray coating is greater than about 9. In another embodiment, the specific gravity of the spray coating is greater than about 12.

The portions of the club head that are spray coated may be sprayed prior to assembly, after partial assembly, or post assembly. For example, the spray coating may be applied only to the interior of the club head. As such, if the club head is formed from multiple components, as described above, the various components may be spray coated in certain areas prior to assembly. Likewise, if the interior of the club head remains accessible after assembly of most of the components, the spray coating may occur prior to the remainder of the assembly. The spray coating may also be applied to select exterior portions of the club head. For example, the interior or exterior of the skirt of the club may have one or more pockets, depressions, or cavities. A spray coating may be employed to fill the pockets, depressions, or cavities. In one embodiment, portions of the sole, toe and heel of the club head are sprayed with a coating in order to increase the forgiveness of the club head. In another embodiment, a spray coating is applied to the entire exterior of the club head. Alternatively, the spray coating may be applied to the entire interior of the club head. A spray coating may also be applied to every surface of the club except for the face of the club.

Figure 26:
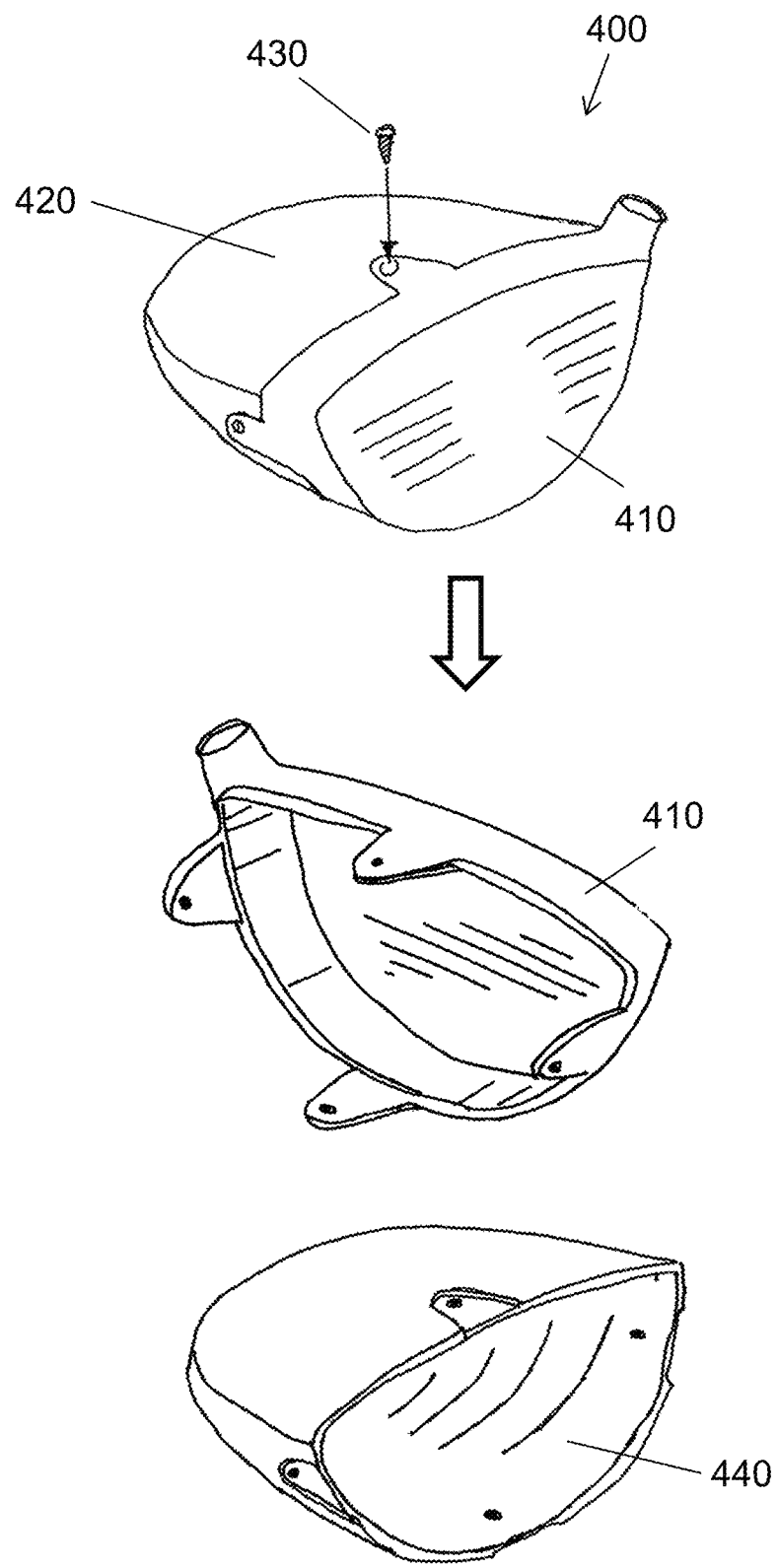
FIG. 26 shows an embodiment of a club head with a detachable face plate to allow access to the interior of the club head.

In an embodiment, a club head, for example a driver head, may be designed with removable elements that allow access to the interior of the head at a later time. As shown in FIG. 26, a club head 400 can be constructed with removable elements, such as a face plate 410. Access to the interior of the body 420 can be gained by removing screws 430, however other methods of releaseably attaching an element of the club to gain post-production access may also be used. For example, the club heads shown in FIGS. 13-16 allow access to the interior space of the club head. Other methods may include a two-piece body that parts at an equator that runs from the crown to the sole (not shown) or a removable sole, or a portion of the sole, with press-fittings or tabs. In the embodiment shown in FIG. 26, once the face plate 410 is removed from the body 420, it is possible to access the interior 440.

Figure 27:
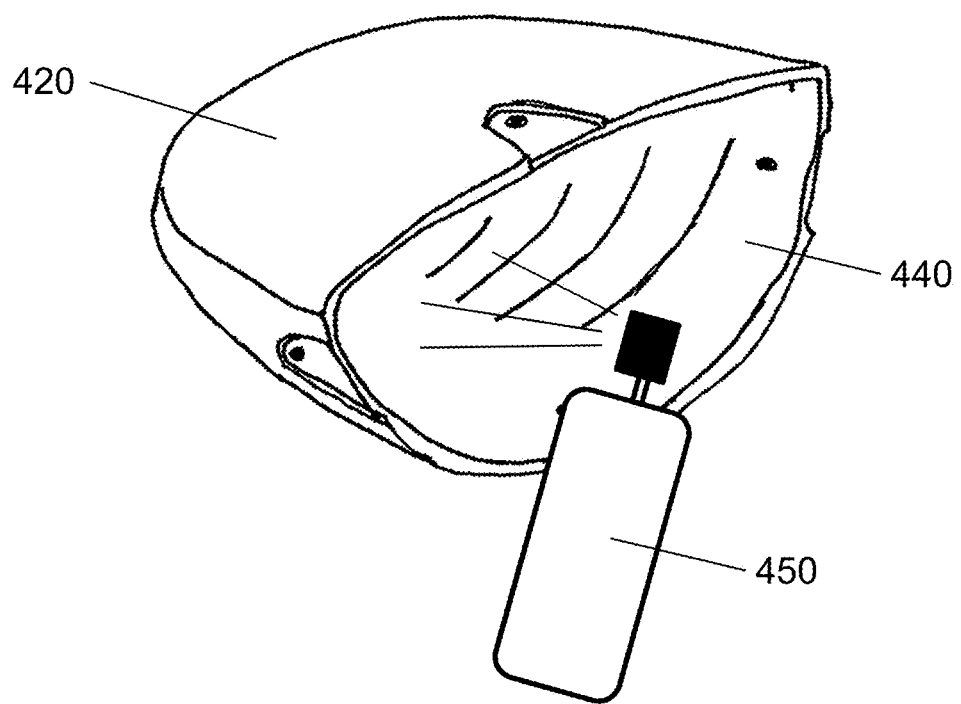
FIG. 27 shows spraying a high-specific gravity coating inside a club head.
Figure 28:
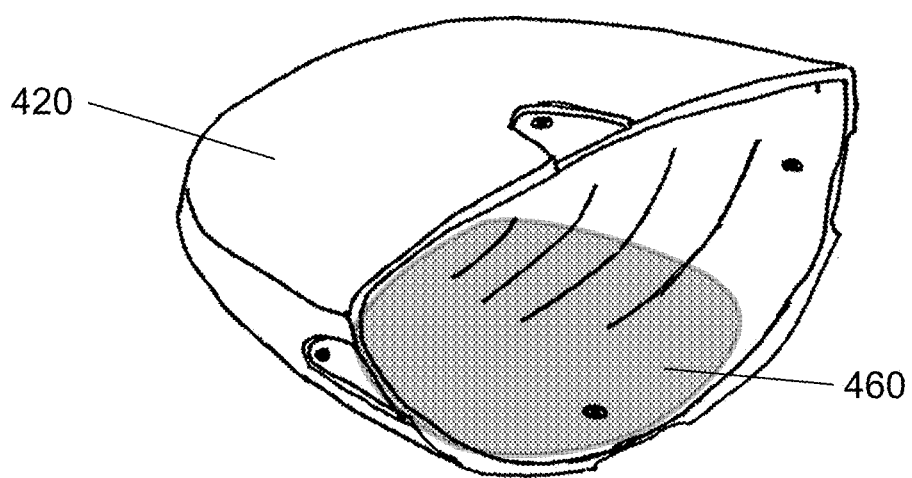
FIG. 28 shows a high specific-gravity coating distributed on the interior of the sole of a club head.

As shown in FIG. 27, once the interior 440 is accessible, it is possible to change the weight distribution of the club head by distributing a high-specific gravity composition, such as a spray coating described above. For example, the interior 440, or portions of the interior 440 may be coated with a tungsten-containing spray coating 450. As shown in FIG. 28, the coating may be only sprayed on the lower interior surfaces of the club head, allowing the center of gravity to be lowered in the club head. Alternatively, the coating may only be sprayed on the toe-end interior surfaces, thereby moving the center of gravity away from the hosel.

As described herein, spray coatings allow flexibility in where the weight is placed in the head, and also provide flexibility as to the amount of weight that is added. In contrast to the moveable insert systems described above, the amount of weight added with spray coatings is continuously variable. More weight can be added by simply applying another layer of spray coating. When combined with a removable element, such as faceplate 410, it is possible for a user or a golf professional to adjust the center of gravity of the club head in order to better suit the swing of the user. Additionally, the spray coating may be used to "true-up" the weight of the club head either after manufacture or after the club has been played for some time.

The spray coating may have a thickness ranging from about 10 microns to about 10 mm. In one embodiment, the spray coating is about 0.01 mm to about 5 mm. In another embodiment, the spray coating is about 0.02 mm to about 4 mm. In still another embodiment, the spray coating is about 0.04 mm to about 2 mm. In addition, various portions of the club head may have a spray coating with a first thickness and other various portions with a second thickness. The spray coating may be applied such that there are at least three portions of the interior of the club head with different thicknesses ranging from about 10 microns to about 10 mm.

High-Specific Gravity Conformable Materials

As an alternative to or in combination with the weighted inserts, adjustable inserts, and spray coatings described above, gels, putties, epoxies, caulk, and glues having high-specific gravity may be used to alter the weight distribution of the club head. These formulations are referred to generally as conformable materials because they conform to the contours of the space that they are placed into spontaneously, or with manipulation by a user. The specific gravity of the conformable materials may be at least about 4, e.g., at least about 7. In one embodiment, the specific gravity of the conformable material is greater than about 9. In another embodiment, the specific gravity of the conformable material is greater than about 12.

Figure 29:
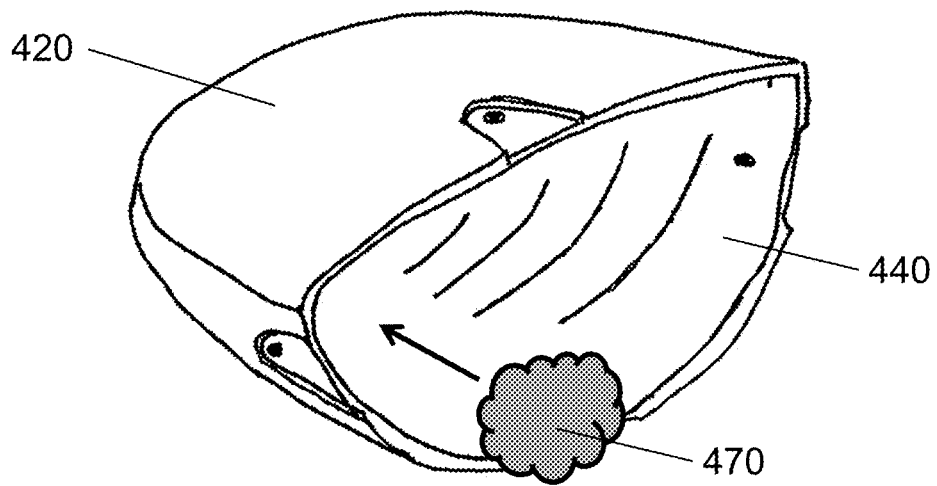
FIG. 29 shows placement of a high specific-gravity conformable material inside a club head.
Figure 30:
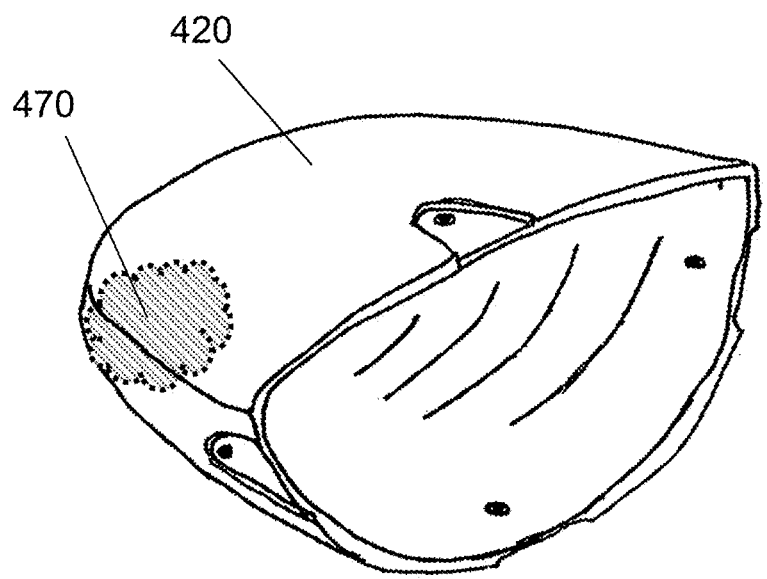
FIG. 30 shows placement of a high specific-gravity conformable material inside a club head.

These materials may be added to the interior or the exterior of the club head in order to change the center of gravity of the club head or to change the total weight of the club head. The materials may be shapeable, such as putties, or the materials may begin as a liquid and harden into a solid, such as epoxies and glues. As shown in FIGS. 29 and 30, a conformable material 470 may be placed in the interior 440 of the body 420 of a club head, thereby altering the center of mass of the club head 400. The conformable material 470 may be pressed into an interior corner of the body 420, or the conformable material may be distributed along a surface of the body 420, for example the sole. Because the conformable material is sticky, it binds to the interior surface and remains in place even with regular striking of the head 400.

In an alternative embodiment, the conformable material may be a high specific-gravity liquid that cures into a solid. For example a two-part epoxy can be infused with tungsten filings and then poured into a club head, for example the club head shown in FIG. 26. By placing the club head in the correct orientation during the curing process, the weight may be placed in the optimum location to affect the center of gravity. For example, the epoxy can be allowed to pool in the lower portion of the interior of the club head, thereby moving the center of gravity down. An epoxy may comprise and epoxide resin and a polyamine hardener. The specific gravity of the modified epoxy may be at least about 4, e.g., at least about 7. In one embodiment, the specific gravity of the modified epoxy is greater than about 9. In other embodiments, the modified epoxy may contain granules of high specific-gravity materials, such as powders or shot.

As mentioned previously, adhesives are known to be used to "true-up" the swing weight of a club and also to retain any debris that may be left in the club head during fabrication. Unlike the known adhesives, however, the specialty high-specific gravity polymer compositions of the invention allow precise and removable placement of weight within the club head. In some instances, this feature will allow for a club to be rebalanced after fabrication to achieve a more desirable center of gravity, or to compensate for small errors in the fabrication process that have left the club head with a less-than-optimal center of gravity.

Figure 31:
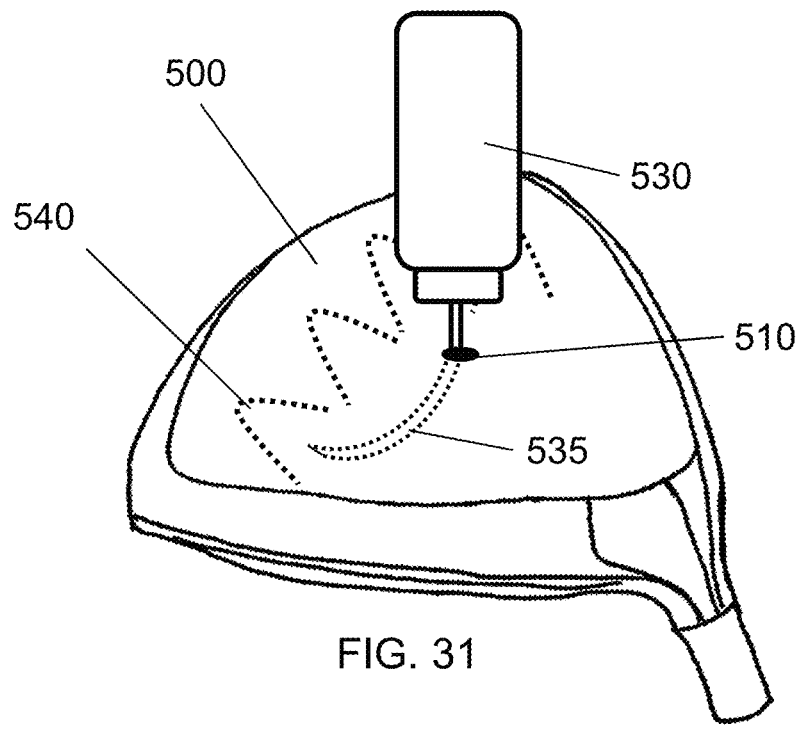
FIG. 31 shows placement of a high specific-gravity adhesive mixture inside an indexed depression inside a club head.
Figure 32:
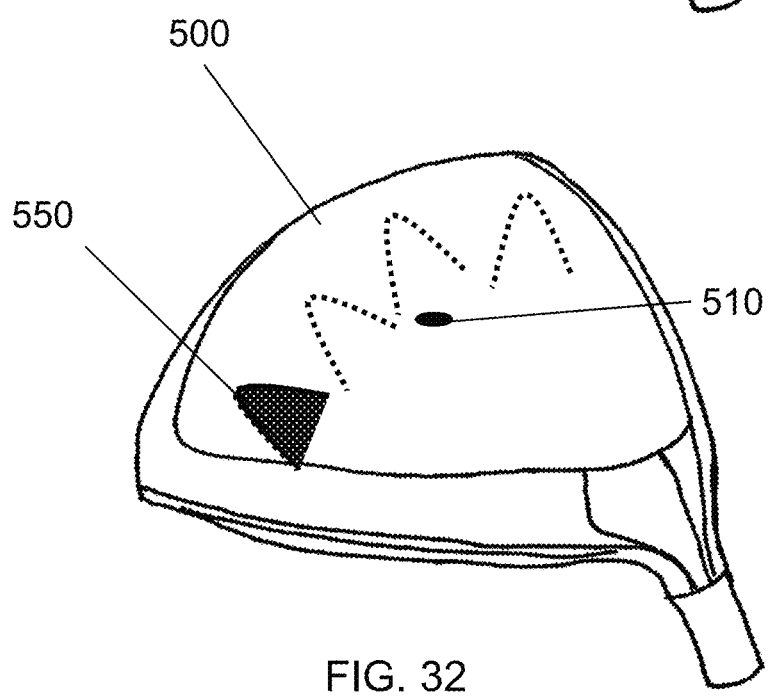
FIG. 32 shows a cured high specific-gravity adhesive in an indexed depression inside a club head.

High specific-gravity adhesives may be delivered through a port in a club head after the head has been fabricated, as shown in FIGS. 31 and 32. For example, as shown in FIG. 31 a high specific-gravity adhesive can be injected into a club head 500 through a port 510 using a squeeze bottle 530 with a direction applicator 535. Because of the direction applicator 535, it is possible to carefully direct the high specific-gravity adhesive to the desired location inside the club head, for example a corner of the club furthest from the face and hosel.

In some clubs, such as shown in FIGS. 31 and 32, the club head may have interior indexed depressions 540 that allow a trained user, for example a golf professional or a club fitter, to locate a specific location in the interior of the club head. Using the direction applicator 535 it is possible to "feel" the interior walls of the club head and then count indexed depressions to assure that the adhesive is placed in the desired position in order to improve the performance of the club. The indexed depressions 540 may be cast or forged into the head during fabrication or the indexed depressions 540 may be cut into the head during fabrication. The indexed depressions 540 may be placed throughout the interior of the club, however they will often be fabricated into the sole of the club. The indexed depressions 540 may be overlayed to provide specific volumes to fill with adhesives, e.g., 1 cc, then 2 cc, then 4 cc. Because the specific gravity of the adhesive is measureable, it will be possible to know the volume filled for a given weight change and vice-versa. Once the adhesive has cured, it will form an indexed weighted portion 550.

The adhesive may be applied to a club in which the interior is directly accessible, such as shown in FIG. 26. However, port access will provide certain advantages in that the club will be structurally unchanged after the process is complete. That is, there will not be concerns about the relationship between the various club angles which may be disrupted when the club head is disassembled and re-assembled.

Kits for modifying the center of gravity of a golf club head are also disclosed. Such kits may include instructions for assessing if, by how much, and in which direction, the center of gravity of the club head should be adjusted. The instructions may teach how to disassemble a club head, e.g., a club head shown in FIG. 26, in order to access an interior of the club head to add or remove a weighted material. In some embodiments, the kit may include a specialized tool, e.g., a star-shaped driver, to remove a fastener that allows a portion of the club head to be removed to give access to the interior. In other embodiments, the kit may include instructions and a polymer composition comprising a metal, to be used in adjusting the center of gravity of the club head.

The instructions for modifying the center of gravity of a golf club head need not be in a written format. The instructions may comprise an audio or video recording, a podcast, or cartoon explaining how to modify the center of gravity of a golf club head. The instructions may provide directions for accessing content relevant to modifying the center of gravity of a golf club head over a network, e.g., over the internet or with a smart phone. The instructions may include tutorials for disassembling a golf club head, reassembling a golf club head, inserting a high specific gravity material, removing a high specific gravity material, evaluating the weight of a golf club or a golf club head, or evaluating the trajectory of a golf ball to determine how to modify the center of gravity of a golf club head. In some embodiments, the instructions are written and include pictures.

In some embodiments, the kit will additionally include a golf club, having a club head. In some embodiments, the kit will include a golf club head. In some embodiments, the kit will be a set of a type of golf club heads, e.g., drivers, fairway woods, hybrids, irons, putters, etc. In some embodiments, the kit will be a set of a type of golf clubs, e.g., drivers, fairway woods, hybrids, irons, etc. In some embodiments, the kit will comprise a plurality of high specific gravity materials that may be placed in or on the club to modify the center of gravity.

Other than in the operating examples, or unless otherwise expressly specified, all of the numerical ranges, amounts, values and percentages such as those for amounts of materials, moments of inertias, center of gravity locations, loft and draft angles, and others in the following portion of the specification may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus the present invention should not be limited by the above-described exemplary embodiments, but should be defined only in accordance with the following claims and their equivalents. Furthermore, while certain advantages of the invention have been described herein, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein. U.S. Design Pat. No. D567,888, is incorporated herein by reference.

The invention claimed is:

1. A method of modifying the center of gravity of a golf club head comprising:
   removing a portion of a club head, having a face, a back, a heel, a toe, a sole, and a crown that together form a hollow interior volume, to access the interior of the club head;
   contacting the interior of the club head with a polymer composition comprising a metal and having a specific gravity greater than about 4; and
   reassembling the club head.

2. The method of claim 1, wherein contacting comprises spraying a coating comprising a polymer and a metal.

3. The method of claim 2, wherein the metal is selected from tungsten, nickel, copper, iron, gold, platinum, lead, silver, molybdenum, silver, and uranium.

4. The method of claim 1, wherein contacting comprises inserting a conformable polymer composition comprising a metal and having a specific gravity greater than about 4.

5. A method of modifying the center of gravity of a golf club head comprising:
- removing a portion of a club head, having a face, a back, a heel, a toe, a sole, and a crown that together form a hollow interior volume, to access the interior of the club head;
- removing from the interior of the club head a polymer composition comprising a metal and having a specific gravity greater than about 4; and
- reassembling the club head.

\* \* \* \* \*